(12) United States Patent
Ohta

(10) Patent No.: US 8,447,071 B2
(45) Date of Patent: May 21, 2013

(54) METHOD OF AUTOMATICALLY TRACKING AND PHOTOGRAPHING CELESTIAL OBJECTS AND PHOTOGRAPHIC APPARATUS EMPLOYING THIS METHOD

(75) Inventor: Makoto Ohta, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 210 days.

(21) Appl. No.: 13/114,320

(22) Filed: May 24, 2011

(65) Prior Publication Data
US 2011/0293139 A1    Dec. 1, 2011

(30) Foreign Application Priority Data
May 25, 2010   (JP) ................... 2010-119701

(51) Int. Cl.
*G06K 9/00*    (2006.01)
(52) U.S. Cl.
USPC ............................ 382/103; 342/140; 348/135
(58) Field of Classification Search
USPC ................. 382/100, 103, 106; 348/135, 143, 348/144, 169–172; 342/118, 139, 140
See application file for complete search history.

(56) References Cited

U.S. PATENT DOCUMENTS

| | | | |
|---|---|---|---|
| 4,688,092 A * | 8/1987 | Kamel et al. .................. 348/147 |
| 7,057,645 B1 | 6/2006 | Hara et al. | |
| 7,786,925 B1 * | 8/2010 | Knibbe et al. .................. 342/52 |
| 8,279,522 B2 * | 10/2012 | Fujimoto et al. ............. 359/430 |
| 2003/0202682 A1 | 10/2003 | Yanagisawa et al. | |
| 2006/0092508 A1 * | 5/2006 | Baun et al. ..................... 359/429 |
| 2006/0158722 A1 * | 7/2006 | Fujimoto et al. .............. 359/399 |
| 2006/0284495 A1 | 12/2006 | Seo et al. | |
| 2010/0103251 A1 * | 4/2010 | Numako ........................ 348/61 |
| 2010/0128110 A1 * | 5/2010 | Mavromatis ................... 348/47 |

FOREIGN PATENT DOCUMENTS

| | | |
|---|---|---|
| JP | 06-130446 | 5/1994 |
| JP | 2000-224470 | 8/2000 |
| JP | 2003-259184 | 9/2003 |
| JP | 2003-298915 | 10/2003 |
| JP | 2004-201056 | 7/2004 |
| JP | 2006-279135 | 10/2006 |

(Continued)

OTHER PUBLICATIONS

International Search Report, dated Jun. 7, 2011 along with an English translation thereof.

(Continued)

*Primary Examiner* — Anand Bhatnagar
(74) *Attorney, Agent, or Firm* — Greenblum & Bernstein, P.L.C.

(57) ABSTRACT

A method of automatically tracking and photographing a celestial object, includes inputting latitude information, photographing azimuth angle information and photographing elevation angle information of a photographic apparatus; inputting star map data of a certain range including data on a location of a celestial object from the latitude information, the photographing azimuth angle information and the photographing elevation angle information; calculating a deviation amount between a location of the celestial object that is imaged in a preliminary image obtained by the photographic apparatus and the location of the celestial object which is defined in the input star map data; correcting at least one of the photographing azimuth angle information and the photographing elevation angle information using the deviation amount; and performing a celestial-object auto-tracking photographing operation based on the corrected at least one of the photographing azimuth angle information and the photographing elevation angle information.

13 Claims, 11 Drawing Sheets

FOREIGN PATENT DOCUMENTS

| | | |
|---|---|---|
| JP | 2006-287375 | 10/2006 |
| JP | 2007-025616 | 2/2007 |
| JP | 2007-089087 | 4/2007 |
| JP | 2008-017223 | 1/2008 |
| JP | 2008-289052 | 11/2008 |
| JP | 2009-224890 | 10/2009 |
| JP | 2009-288269 | 12/2009 |

OTHER PUBLICATIONS

International Search Report, dated Jul. 24, 2012 along with an English translation thereof.
U.S. Appl. No. 13/109,247 to Makoto Ohta, filed May 17, 2011.
U.S. Appl. No. 13/117,517 to Makoto Ohta, filed May 27, 2011.

* cited by examiner

METHOD OF AUTOMATICALLY TRACKING AND PHOTOGRAPHING CELESTIAL OBJECTS AND PHOTOGRAPHIC APPARATUS EMPLOYING THIS METHOD

BACKGROUND OF THE INVENTION

1. Field of the Invention

The present invention relates to a method of automatically tracking and photographing celestial objects which enables the capture of a freeze-frame picture of a celestial object(s) in long exposure astrophotography, and further relates to a photographic apparatus employing this method.

2. Description of the Related Art

If long exposure astrophotography is carried out with a fixed camera (photographic apparatus), added light of stars during a long exposure form straight or curved light trails in the captured image, since celestial objects move relative to the camera due to the earth's rotation (diurnal motion). To carry out a long exposure in order to photograph a celestial object so that the celestial object appears to be still (stationary) relative to a photosensitive film or an image sensor (image pickup device), an equatorial equipped with an auto tracking system is generally used.

In recent years, a method of obtaining a still image of celestial objects such as planets and stars in long exposure astrophotography has been proposed in which a celestial object(s) is photographed a plurality of times with a fixed digital camera without using an equatorial, and thereafter, the images thus obtained at the plurality of times are added while correcting the positions of the celestial object (s) using data on the obtained images (see Japanese Unexamined Patent Publications Nos. 2006-279135 and 2003-259184).

However, an equatorial equipped with an auto tracking system is generally expensive, heavy and difficult to handle. The type of digital camera (disclosed in Japanese Unexamined Patent Publications Nos. 2006-279135 and 2003-259184) which synthesizes a plurality of images has inferior image registration accuracy and is slow in image processing speed, and therefore, it is practically impossible to synthesize a plurality of astronomical images using only such a type of digital camera while performing tracking astrophotography.

SUMMARY OF THE INVENTION

The present invention provides a method of automatically tracking and photographing celestial objects which enables the capture of a still image of a celestial object(s) such as a star or a planet in a state where each celestial object appears stationary with respect to a fixed point on the rotating Earth in long exposure astrophotography using known star map data (star chart data, star catalogue data) without using an equatorial with a camera (photographic apparatus) directed toward an arbitrarily-selected celestial object and fixed with respect to the ground (earth). The present invention also provides a photographic apparatus that employs this method of automatically tracking and photographing celestial objects.

According to an aspect of the present invention, a method of automatically tracking and photographing an arbitrarily-selected celestial object is provided, including performing a preliminary photographing operation by directing a photographic apparatus toward the celestial object; inputting latitude information, photographing azimuth angle information and photographing elevation angle information of the photographic apparatus obtained during the preliminary photographic operation; inputting star map data of a range corresponding to the input the latitude information, the photographing azimuth angle information and the photographing elevation angle information; calculating a deviation amount between a location of the celestial object that is imaged in a preliminary image obtained by the preliminary photographing operation and a location of the celestial object which is defined in the input the star map data; correcting at least one of the photographing azimuth angle information and the photographing elevation angle information using the deviation amount; and performing a celestial-object auto-tracking photographing operation based on the corrected the at least one of the photographing azimuth angle information and the photographing elevation angle information.

In an embodiment, a method of automatically tracking and photographing an arbitrarily-selected celestial object is provided, which moves relative to a photographic apparatus due to diurnal motion so that an image of the celestial object, which is formed on an imaging surface of an image sensor via a photographing optical system of the photographic apparatus, becomes stationary relative to a predetermined imaging area of the imaging surface of the image sensor during a celestial-object auto-tracking photographing operation, the method including obtaining a preliminary image by performing a preliminary photographing operation using the photographic apparatus, which is directed toward the celestial object calculating a location of the celestial object that is imaged in the obtained the preliminary image; inputting photo date information, latitude information, photographing azimuth angle information and photographing elevation angle information of the photographic apparatus obtained during the preliminary photographing operation; inputting star map data of a range corresponding to the input the photo date information, the latitude information, the photographing azimuth angle information and the photographing elevation angle information; calculating a deviation amount, in a predetermined coordinate system, between the calculated the location of the celestial object that is imaged in the obtained preliminary image and the location of the celestial object which is defined in the input the star map data; correcting at least one of the photographing azimuth angle information and the photographing elevation angle information using the deviation amount; and performing the celestial-object auto-tracking photographing operation based on corrected the at least one of the photographing azimuth angle information and the photographing elevation angle information.

It is desirable for the method to include detecting a posture of the photographic apparatus that is achieved when the preliminary photographing operation is performed using the deviation amount. The performing of the celestial-object auto-tracking photographing operation includes performing the celestial-object auto-tracking photographing operation based on the posture of the photographic apparatus.

It is desirable for the method to include inputting information on the focal length of the photographing optical system, wherein the calculating of the location of the celestial object includes calculating the location of the celestial object in the predetermined coordinate system in the preliminary image from the focal length information, the date information, the latitude information, the photographing azimuth angle information and the photographing elevation angle information.

It is desirable for the photographic apparatus to include an azimuth angle sensor and a gravity sensor, from which the photographing azimuth angle information and the photographing elevation angle information are input, respectively.

It is desirable for the photographic apparatus to include a GPS unit, from which the latitude information is input.

It is desirable for the star map data to include data on right ascensions and declinations of celestial objects including the celestial object which is to be photographed.

It is desirable for the predetermined coordinate system to be an X-Y coordinate system on the imaging plane, wherein the method further includes converting coordinates of the celestial object data which is provided in the star map data to coordinates on the imaging plane, and calculating a photographing azimuth angle and a photographing elevation angle of each of the celestial objects from the latitude information, hour angles of the celestial objects, which are obtained by converting the right ascensions, and the declinations of the celestial objects according to the following equations:

$$A = \arctan(\sin H/(\cos \epsilon \times \tan \delta - \sin \epsilon \times \cos H))$$

$$h = \arcsin(\sin \epsilon \times \sin \delta + \cos \epsilon \times \cos \delta \times \cos H)$$

wherein A designates the photographing azimuth angle, h designates the photographing elevation angle, $\epsilon$ designates the latitude, H designates the hour angle of each of the celestial objects, and $\delta$ designates the declination of each of the celestial objects.

It is desirable for the method to include calculating a difference $\Delta A$ between the photographing azimuth angle 'A' determined from the star map data and input the photographing azimuth angle As and a difference $\Delta h$ between the photographing elevation angle h determined from the star map data and input the photographing elevation angle hs from the following equations:

$$\Delta A = A - As$$

$$\Delta h = h - hs,$$

wherein a center of the imaging plane is defined as an arithmetic image center point O; and calculating coordinates (X, Y) using the focal length information f from the following equations (I) and (II):

$$X = f \times \tan(\arccos(\sin^2(hs + \Delta h/2) + \cos^2(hs + \Delta h/2) \times \cos(\Delta A))) \quad (I)$$

$$Y = f \times \tan \Delta h \quad (II).$$

It is desirable for the method to include converting a position of each celestial object obtained in the preliminary image to an amount of coordinate movement ($\Delta X, \Delta Y$) on the imaging plane according to the following equations:

$$\Delta X = f \times \tan(\arccos(\sin^2(hs + \Delta/2) + \cos^2(hs + \Delta/2) \times \cos(\Delta \alpha)))$$

$$\Delta Y = f \times \tan \Delta h.$$

It is desirable for the method to include calculating amounts of positional deviations $\Delta X$ and $\Delta Y$ of the each celestial object from a corresponding celestial object in the star map data in horizontal and vertical directions, respectively, and calculating, based on the amounts of positional deviations $\Delta X$ and $\Delta Y$ thus calculated, an amount of deviation $\Delta h$ of the photographing elevation angle that is obtained upon the preliminary photographing operation being performed from the arithmetic image center point and an amount of deviation $\Delta A$ of the photographing azimuth angle that is obtained upon the preliminary photographing operation being performed from the arithmetic image center point according to the following equations:

$$\Delta h = \arctan(\Delta Y/f)$$

$$\Delta A = \arccos((\cos(\arctan(\Delta X/f)) - \cos^2(hs + \arctan(\Delta Y/f)/2))/\cos^2(hs + \arctan(\Delta Y/f)/2)).$$

It is desirable for the method to include calculating an azimuth-angle-direction driving speed dA/dt, an elevation-angle-direction driving speed dh/dt and an rotational driving speed d$\theta$/dt when moving the predetermined imaging area in the horizontal and vertical directions and rotating the predetermined imaging area in a rotational direction from the following equations (i), (j) and (k) so that the image of the celestial object that is formed on the imaging surface via the photographing optical system becomes stationary relative to the predetermined imaging area of the imaging surface during the celestial-object auto-tracking photographing operation:

$$dA/dt = \sin \epsilon - \cos \epsilon \times \tan h \times \cos A \quad (i)$$

$$dh/dt = -\sin A \times \cos \epsilon \quad (j)$$

$$d\theta/dt = -\cos A \times \cos \epsilon / \cos h. \quad (k)$$

In an embodiment, a photographic apparatus which automatically tracks and photographs a celestial object, is provided, that moves relative to a photographic apparatus due to diurnal motion so that an image of the celestial object, which is formed on an imaging surface of an image sensor via a photographing optical system of the photographic apparatus, becomes stationary relative to a predetermined imaging area of the imaging surface of the image sensor during a celestial-object auto-tracking photographing operation, the photographic apparatus including an inputter which obtains a preliminary image by directing the photographic apparatus toward an arbitrarily-selected celestial object and performing a preliminary photographing operation using the photographic apparatus, and inputs photo date information, latitude information, photographing azimuth angle information and photographing elevation angle information of the photographic apparatus obtained during the preliminary photographing operation; an image-sensor mover which linearly moves the image sensor in directions orthogonal to an optical axis of the photographing optical system and rotates the image sensor about the optical axis; and a controller which controls operations of the photographic apparatus. The controller inputs star map data of a range corresponding to the input the photo date information, the latitude information, the photographing azimuth angle information and the photographing elevation angle information; calculates a deviation amount between the location of the celestial object that is obtained from the preliminary image and the location of the celestial object which is defined in the input the star map data; corrects at least one of the photographing azimuth angle information and the photographing elevation angle information using the deviation amount; and performs the celestial-object auto-tracking photographing operation based on corrected the at least one of the photographing azimuth angle information and the photographing elevation angle information.

According to the method of automatically tracking and photographing celestial objects, and a photographic apparatus that employs this method, according to the present invention, it is possible to capture a still image of a celestial object (s) such as stars and planets in a state where each celestial object appears stationary with respect to a fixed point on the (rotating) Earth in long exposure astrophotography using known star map data without using an equatorial with a camera (photographic apparatus) directed toward an arbitrarily-selected celestial object and fixed with respect to the ground (earth).

The present disclosure relates to subject matter contained in Japanese Patent Application No. 2010-119701 (filed on May 25, 2010) which is expressly incorporated herein by reference in its entirety.

BRIEF DESCRIPTION OF THE DRAWINGS

The present invention will be described below in detail with reference to the accompanying drawings in which:

FIGS. 7A and 7B are explanatory diagrams for illustrating a technique of determining driving speeds dA/dt, dh/dt and dθ/dt for automatically tracking and photographing a celestial object (point of interest) S using declination δ, hour angle H, photographing azimuth angle A, photographing elevation angle h with respect to the celestial object, and focal length f of the digital camera in the celestial-object auto-tracking photographing operation according to the present invention, wherein FIG. 7A is a diagraph illustrating an equatorial coordinate system and FIG. 7B is a diagraph illustrating a spherical triangle on the celestial hemisphere shown in FIG. 7A;

DESCRIPTION OF THE EMBODIMENT

Figure 1:
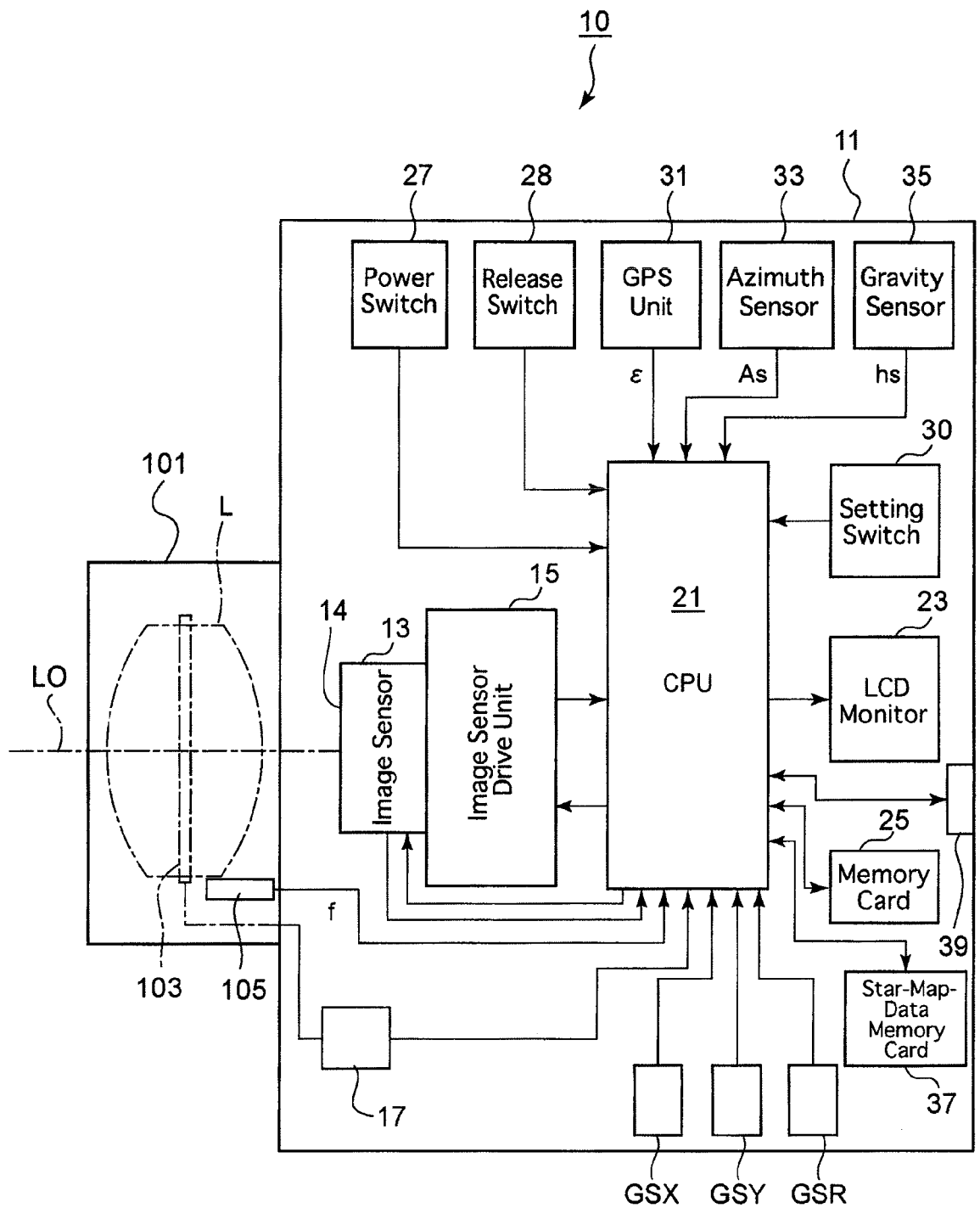
FIG. 1 is a block diagram illustrating main components of an embodiment of a digital camera which is capable of automatically tracking and photographing celestial objects according to the present invention.

An embodiment of a method of automatically tracking and photographing celestial objects according to the present invention and an embodiment of a digital camera 10 employing this method will be discussed hereinafter. As shown in FIG. 1, the present embodiment of the digital camera (photographic apparatus) 10 is provided with a camera body 11 and a photographing lens 101 (that contains a photographing optical system L). The digital camera 10 is provided, in the camera body 11 behind the photographing optical system L, with an image sensor 13 serving as an image pickup device. An optical axis Z of the photographing optical system L is orthogonal to an imaging surface (photosensitive surface/imaging plane) 14 of the image sensor 13. The image sensor 13 is mounted onto an image sensor drive unit (image sensor mover/anti-shake unit) 15. The image sensor drive unit 15 is provided with a fixed stage, a movable stage which is movable relative to the fixed stage, and an electromagnetic circuit for moving the movable stage relative to the fixed stage. The image sensor 13 is held by the movable stage. The image sensor 13 (the movable stage) is controlled and driven to linearly move in desired directions orthogonal to the optical axis Z at a desired moving speed and to rotate about an axis parallel to the optical axis Z (instantaneous center at some point in a plane orthogonal to the optical axis Z) at a desired rotational speed. This type of image sensor drive unit 15 is known in the art as an anti-shake unit of an image shake corrector (shake reduction system) incorporated in a camera disclosed in, e.g., Japanese Unexamined Patent Publication No. 2007-25616.

The photographing lens 101 is provided with a diaphragm (adjustable diaphragm) 103 in the photographing optical system L. The f-number (degree of opening/closing the diaphragm 103) is controlled by a diaphragm drive control mechanism 17 provided in the camera body 11.

The digital camera 10 is provided with a CPU 21 which controls the overall operation of the digital camera 10. The CPU (controller/calculator) 21 drives the image sensor 13 and controls the operation thereof, and performs a signal processing operation on an image signal of a captured object image to display this image on an LCD monitor 23, and writes image data of this image onto a removable memory card 25. To detect vibrations applied to the digital camera 10 when the image sensor drive unit 15 is used as an anti-shake unit, the CPU 21 inputs focal length information f concerning the photographing lens 101 from a focal length detector 105 provided in the photographing lens 101 and also inputs signals detected by an X-direction gyro sensor GSX, a Y-direction gyro sensor GSY and a rotational-direction gyro sensor GSR.

A memory card 37, in which data on star map (star catalogue) is stored in advance, is removably installed in the camera body 11 to serve as an inputter for inputting the star map data into the CPU 21. Instead of using a removable memory card (memory in which star map data is stored) such as the memory card 37, the star map data can be downloaded from a personal computer by data transmission via a data-transmission terminal 39 that is provided on the camera body 11. Although various star map data are available, the star map data used in the present embodiment is data on right ascensions and declinations of principal celestial objects (stars) on a specific Modified Julian Date (MJD). There are an infinite number of celestial objects in the universe, ranging from bright celestial objects to dark celestial objects, and accordingly, the volume of the star map data becomes huge if all the celestial objects in the universe are attempted to be included. Therefore, it is practical for the star map data to be made only for celestial objects having at least a predetermined apparent magnitude. The number of celestial objects having an apparent magnitude of at least +3 is slightly smaller than 300 and the number of celestial objects having an apparent magnitude of at least +4 is slightly smaller than 1000, and accordingly, the star map data becomes very small just by limiting the star map data to that for celestial objects having an apparent magnitude of at least +4.

The camera body 11 is provided with various switches such as a power switch 27, a release switch 28 and a setting switch 30. The CPU 21 performs controls according to the ON/OFF states of these switches 27, 28 and 30. For instance, the CPU 21 turns ON/OFF the power supply from a battery (not shown) upon receipt of an operation signal from the power switch 27, and performs a focusing process, a photometering process and an image capturing process (astronomical-image capturing process) upon receipt of an operation signal from the release switch 28. The setting switch 30 is for selectively setting various photography modes (exposure modes) such as a celestial-object auto tracking photography mode and a normal photography mode.

The digital camera 10 is provided in the camera body 11 with a GPS unit 31 serving as a latitude information inputter, an azimuth sensor 33 serving as an azimuth information inputter, and a gravity sensor 35 serving as a photographing elevation angle information inputter. Latitude information E, azimuth information and (photo date information) date/time information (Greenwich Mean Time information) are input to the CPU 21 from the GPS unit 31, and photographing azimuth angle information As and photographing elevation angle information hs are input to the CPU 21 from an azimuth angle sensor 33 and a gravity sensor 35, respectively. The CPU 21 drives the image sensor drive unit 15 and controls operation thereof based on the latitude information $\epsilon$ and the date/time information (Greenwich Mean Time information), which are input from the GPS unit 31, the photographing azimuth angle information As and the photographing elevation angle information hs, which are respectively input from the azimuth angle sensor 33 and the gravity sensor 35, and focal length information f input from the focal length detector 105. A reference position of the camera body 11 (specifically the image sensor 13 thereof) is, e.g., a position (posture) in which the long-side direction of the image sensor 13 is coincident with the horizontal direction (X-direction), and this reference position is defined by an X-Y coordinate system, the X-axis (X-direction) and Y-axis (Y-direction) of which correspond to the long-side direction and the short-side direction of the rectangular image sensor 13, respectively.

Each of the above described GPS unit 31, azimuth sensor 33 and gravity sensor 35 can be not only a built-in type that is incorporated into the camera body 11 but an external type that is attached to the camera body. Specifically, it is possible to install such external devices to an accessory shoe or a bracket attached to the base plate of the camera body 11, and output signals from the external devices can be input to the CPU 21 via electrical contacts on the accessory shoe or a connector such as a USB connector (socket/plug). Date/time information that is input to the CPU 21 can be obtained from a built-in clock, and latitude information $\epsilon$ can be manually input to the CPU 21 by the user via the setting switch 30. Since the date/time information input to the CPU 21 from the GPS unit 31 is in Greenwich Mean Time, this date and time in Greenwich Mean Time are converted to the local date and time at a photographic site to be used when data on given celestial objects are input to the CPU 21 from star map data and when the photographing azimuth angle As and the photographing elevation angle hs that are input to the CPU 21 at the time of photographing are calculated.

In the celestial-object auto tracking photography mode, the digital camera 10 operates as follows.

Figure 2:
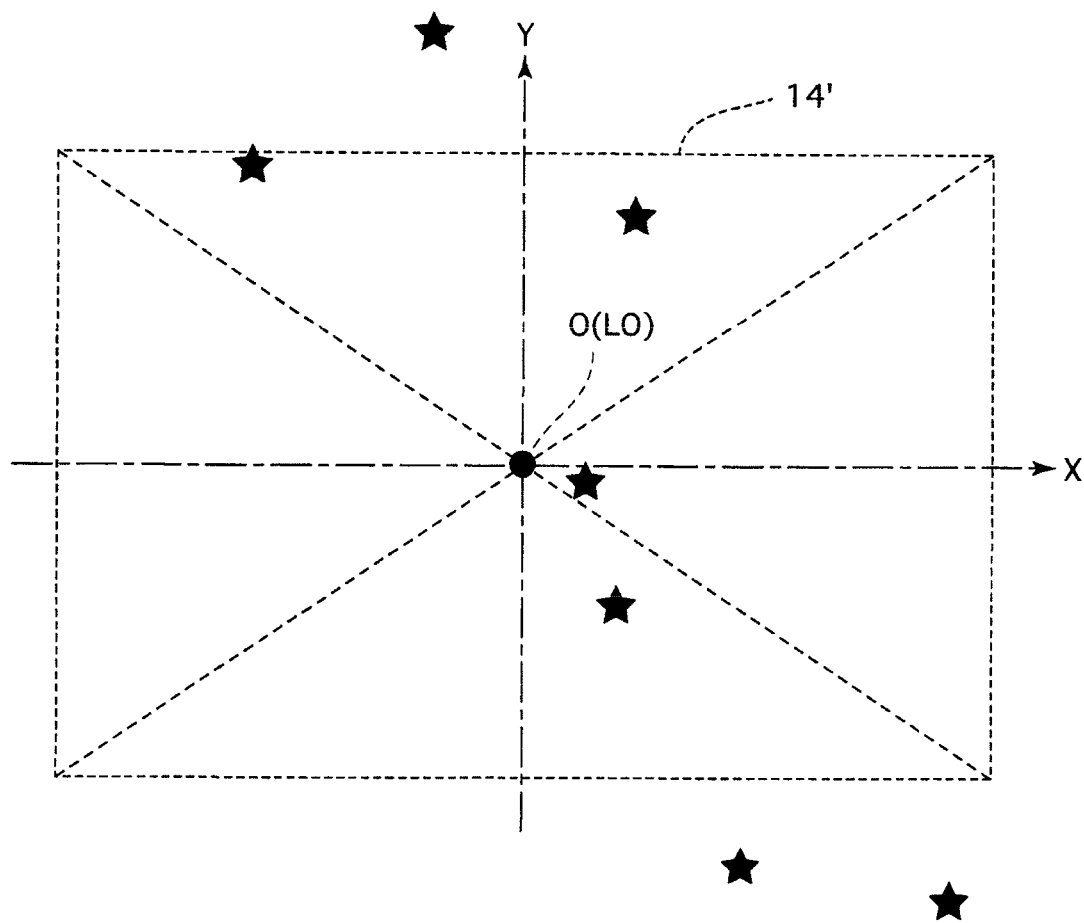
FIG. 2 is a diagram showing an image of the coordinates of celestial objects which are calculated according to star map data.

In a predetermined coordinate system of the imaging surface 14, the location of a target celestial object(s) that is to be photographed is calculated from the latitude information $\epsilon$ and the date/time information (Greenwich mean time information) that are input from the GPS unit 31, the photographing azimuth angle information As that is input from the azimuth angle sensor 33, the photographing elevation angle information hs that is input from the gravity sensor 35, and the focal length information f that is input from the focal length detector 105. Subsequently, star map data is input to the CPU 21 for a specified area including the calculated location of the aforementioned target celestial object(s) in the predetermined coordinate system of the imaging surface 14. FIG. 2 shows an example of the star map data that is input to the CPU 21.

Figure 3:
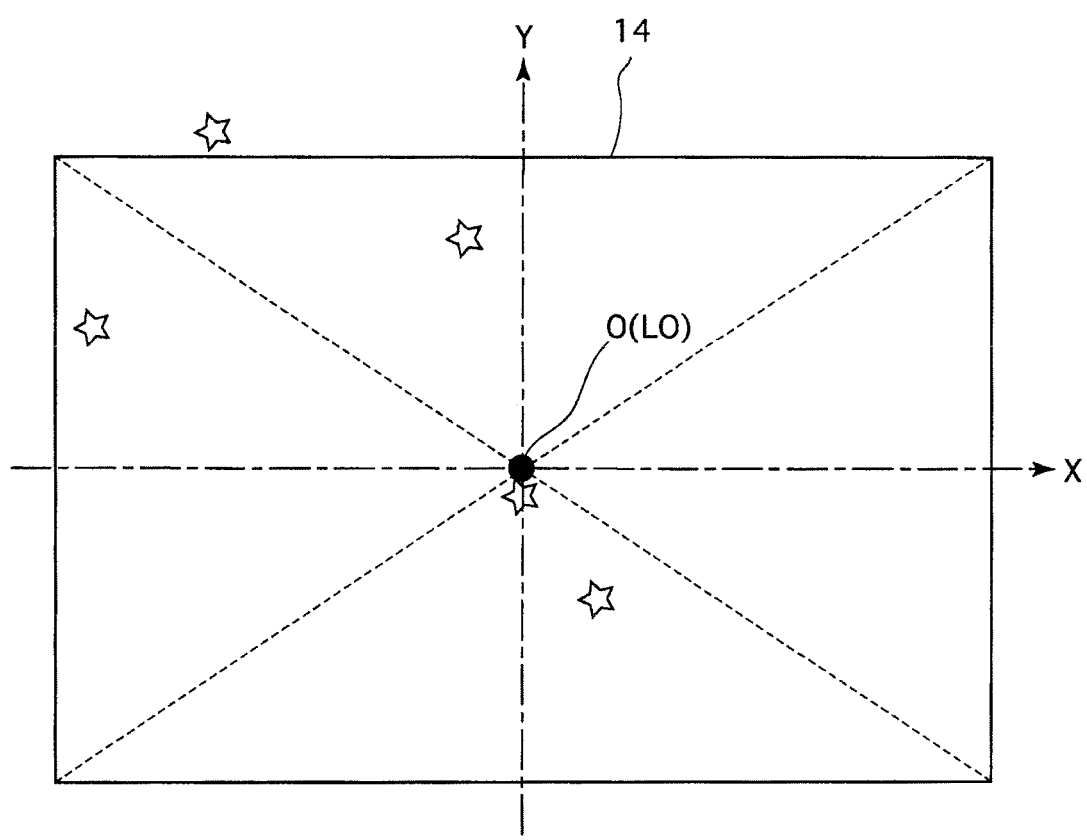
FIG. 3 is a diaphragm showing a preliminary image of celestial objects photographed according to the method of automatically tracking and photographing celestial objects according to the present invention.

On the other hand, with the image sensor 13 fixed to the camera body 11, a preliminary photographing operation is performed to obtain a preliminary image at a short period of exposure time by which relatively bright celestial objects can be photographed to be identified as dots. FIG. 3 shows an example of this preliminary image.

Figure 4:
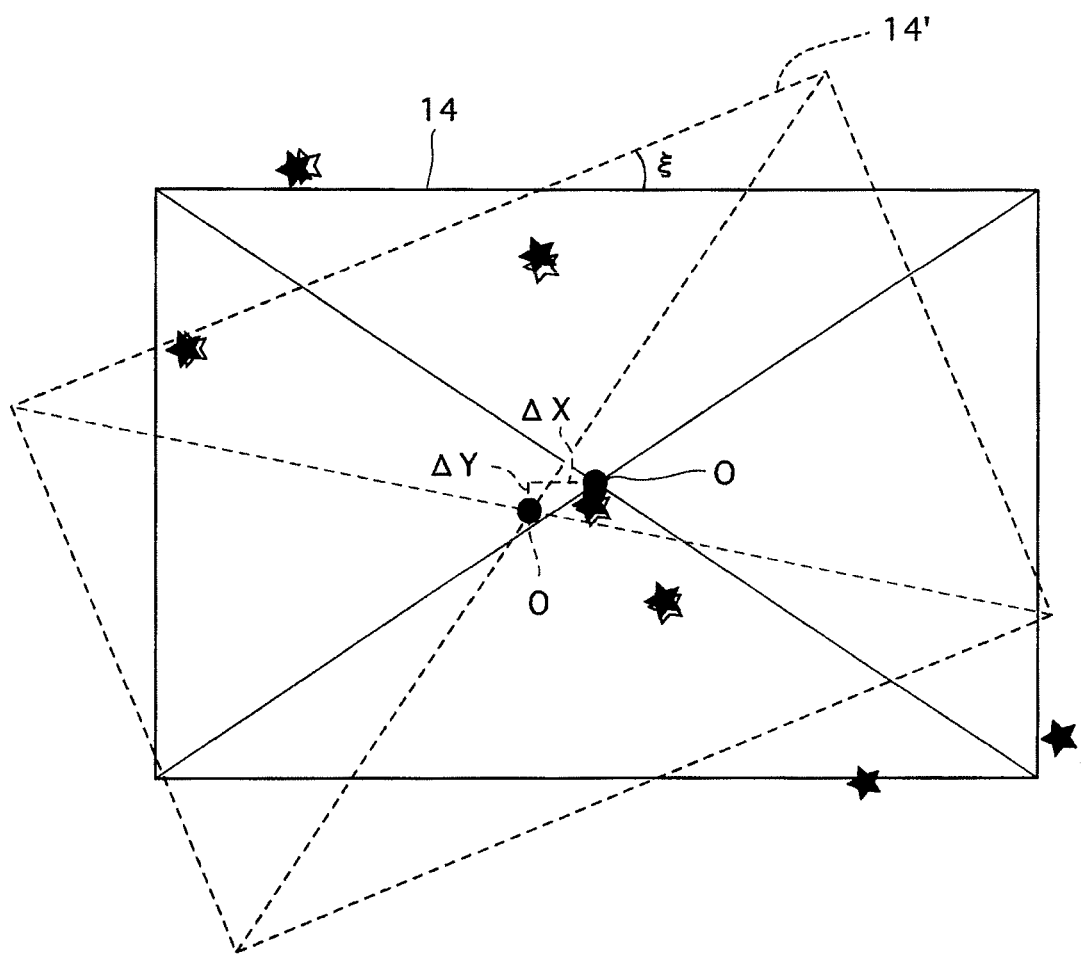
FIG. 4 is a diaphragm for illustrating a state where the image shown in FIG. 2, which shows the coordinates of celestial objects, and the preliminary image shown in FIG. 3 are matched with each other.

Thereafter, in the predetermined coordinate system of the imaging surface 14, the amount of deviation of the location of the celestial object(s) photographed in the obtained preliminary image from the location of the corresponding celestial object(s) according to the input star map data is calculated. From the amount of deviation thus obtained, the photographing azimuth angle information As that is input from the azimuth angle sensor 33 and the photographing elevation angle information hs that is input from the gravity sensor 35 are corrected to obtain more precise photographing azimuth angle information (corrected photographing azimuth angle information) A and more precise photographing elevation angle information (corrected photographing elevation angle information) h. FIG. 4 shows an actual example of a method for this correction. An inclination angle (shown in FIG. 4) between the imaging surface 14 in the preliminary photographing operation and an imaginary imaging surface 14' created according to the input star map data in a state where the positions of the celestial objects shown in FIG. 2 and those shown in FIG. 3 are matched shows that the camera body 11 has rotated by the inclination angle $\xi$ about the optical axis LO at the photographing elevation angle h when the preliminary photographing operation is performed. The inclination angle $\xi$ is referred to as "camera posture" in the descriptions of the present invention.

Lastly, based on the corrected photographing azimuth angle information A and the corrected photographing elevation angle information h, the CPU 21 performs an actual photographing operation (celestial-object auto-tracking photographing operation) while linearly moving the image sensor 13 and controlling movement thereof in a plane orthogonal to the optical axis LO via the image sensor drive unit 15.

This makes it possible to obtain a freeze-frame picture of the target celestial object in long exposure astrophotography. The actual photographing operation (celestial-object auto-tracking photographing operation) is performed at an exposure time (tracking photography exposure time) T which is arbitrarily set by the user. After a lapse of the set exposure time T, the CPU 21 inputs an image signal from the image sensor 13, converts this input image signal into image data of a predetermined format to display an image of this image data on the LCD monitor 23, and writes this image data into the memory card 25.

The order of inputting star map data and obtaining a preliminary image can be arbitrary. Namely, the CPU 21 can obtain a preliminary image before or after inputting star map data to calculate the amount of deviation of the location of the celestial object(s) photographed in the obtained preliminary image from the location of the corresponding celestial object(s) according to the input star map data.

If the digital camera 10 is of a type equipped with a mechanical shutter, the commencement of an exposure and the termination thereof include a mechanical shutter opening process and a mechanical shutter closing process, respectively. If the digital camera 10 is of a type equipped with an electronic shutter, the exposure commencement and the exposure termination include a process of commencing an exposure upon sweeping out electric charges accumulated in the image sensor 13 and a process of terminating the exposure upon transferring or reading out these electric charges, respectively.

The celestial-object auto-tracking photographing operation performed with the digital camera 10 according to the present invention is achieved by fixedly installing the digital camera 10 and then moving the image sensor 13 in the X and Y directions in a plane orthogonal to the optical axis LO and rotating the image sensor 13 about an axis parallel to the optical axis LO. First of all, general principles of this control will be discussed hereinafter. It is herein assumed that the photographing azimuth angle, the photographing elevation angle and the amount of rotation about the optical axis LO of the digital camera 10 are represented by A, h and θ, respectively, and that data for moving the image sensor 13 in the X-direction, data for moving the image sensor 13 in the Y-direction, and data for rotating the image sensor 13 about the center thereof are represented by an azimuth-angle-direction driving speed dA/dt, an elevation-angle-direction driving speed dh/dt and a rotational driving speed dθ/dt, respectively. The image sensor 13 is installed so that the long side of the imaging surface 14 thereof (which extends in the X-direction) extends horizontally in an initial state of the image sensor 13.

Figure 7A:
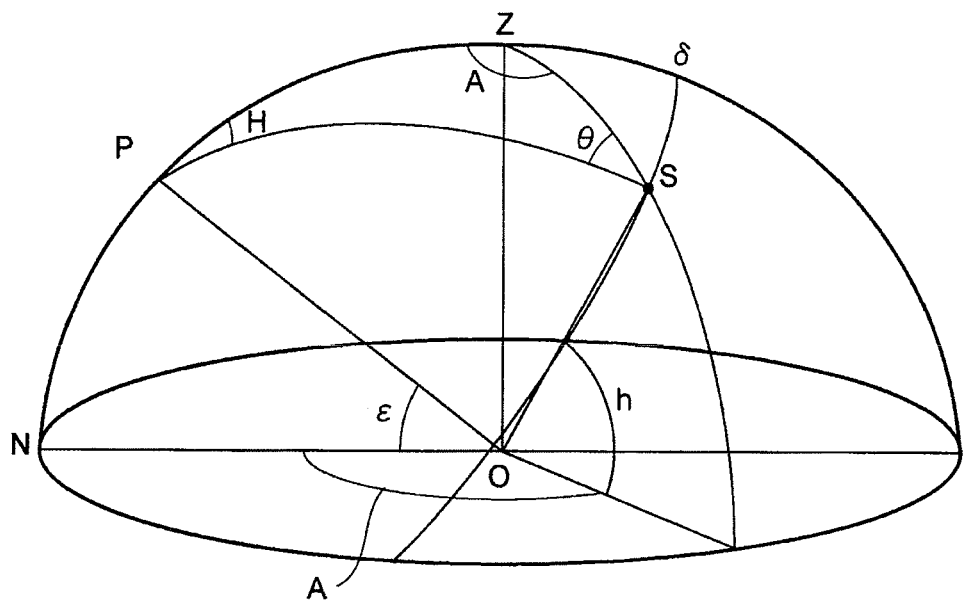
Figure 7B:
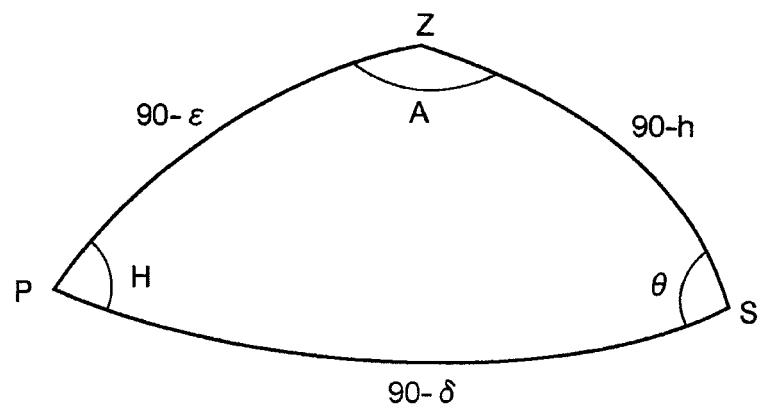

In the celestial diagrams shown in FIGS. 7A and 7B, P, Z, N, S, ε, A, h, H and δ designate north celestial pole (NCP), zenith, true north, target celestial object, latitude at a photographic site, photographing azimuth angle, photographing elevation angle, hour angle of the target celestial object and declination of the target celestial object, respectively; the azimuth-angle-direction driving speed dA/dt, the elevation-angle-direction driving speed dh/dt and the rotational driving speed dθ/dt can be determined in a manner which will be discussed hereinafter.

In regard to the celestial diagrams shown in FIGS. 7A and 7B, the following equations are satisfied:

$$\sin h = \sin \varepsilon \times \sin \delta + \cos \varepsilon \times \cos \delta \times \cos H \quad (a)$$

$$\tan A = \sin H / (\cos \varepsilon \times \tan \delta - \sin \varepsilon \times \cos H) \quad (b)$$

$$\tan \theta = \sin H / (\tan \varepsilon \times \cos \delta - \sin \delta \times \cos H) \quad (c)$$

$$dz/dt = \cos \delta \times \sin \theta \quad (d)$$

(wherein z=90−h)

$$dA/dt = \cos \delta \times \cos \theta / \cos h \quad (e)$$

$$d\theta/dt = -\cos \varepsilon \times \cos A / \cos h \quad (f)$$

The values that are obtained upon providing the latitude ε, the photographing azimuth angle A and the photographing elevation angle h are the declination δ of the target celestial object, the hour angle H of the target celestial object, the azimuth-angle-direction driving speed dA/dt, the elevation-angle-direction driving speed dh/dt and the rotational driving speed dθ/dt. These values are determined by assigning the latitude ε, the photographing azimuth angle A and the photographing elevation angle h to equations (g) through (k) below:

$$\sin \delta = \sin h \times \sin \varepsilon + \cos h \times \cos \varepsilon \times \cos A \quad (g)$$

$$\tan H = \sin A / (\cos \varepsilon \times \tan h - \sin \varepsilon \times \cos A) \quad (h)$$

$$dA/dt = \sin \varepsilon - \cos \varepsilon \times \tan h \times \cos A \quad (i)$$

$$dh/dt = -\sin A \times \cos \varepsilon \quad (j)$$

$$d\theta/dt = -\cos A \times \cos \varepsilon / \cos h \quad (k)$$

In the celestial-object auto-tracking photographing operation (actual photographing operation), if the azimuth-angle-direction driving speed dA/dt, the elevation-angle-direction driving speed dh/dt and the rotational driving speed dθ/dt are calculated, and also if the image sensor 13 is driven to move in the X and Y directions and to rotate about an arithmetic image center O in accordance with the calculated driving speeds dA/dt, dh/dt and dθ/dt, a freeze-frame picture of the target celestial object can be obtained.

The fact that the aforementioned equations (g), (h), (i), (j) and (k) are valid will be discussed (proven) hereinafter.

In a spherical triangle ΔZPS on the celestial hemisphere shown in FIG. 7A, the following three equations are valid according to the spherical law of cosines.

$$\sin(90-h) \times \sin \theta = \sin(90-\varepsilon) \times \sin H$$

$$\sin(90-h) \times \cos \theta = \sin(90-\delta) \times \cos(90-\varepsilon) - \cos(90-\delta) \times \sin(90-\varepsilon) \times \cos H$$

$$\cos(90-h) = \cos(90-\varepsilon) \times \cos(90-\delta) + \sin(90-\varepsilon) \times \sin(90-\delta) \times \cos H$$

If each of the these three equations is modified, the following equations (1), (2) and (3) are obtained.

$$\cos h \times \sin \theta = \cos \varepsilon \times \sin H \quad (1)$$

$$\cos h \times \cos \theta = \cos \delta \times \sin \varepsilon - \sin \delta \times \cos \varepsilon \times \cos H \quad (2)$$

$$\sin h = \sin \varepsilon \times \sin \delta + \cos \varepsilon \times \cos \delta \times \cos H \quad (3)$$

The following equation (4) is obtained from the aforementioned equations (1) and (2). This equation (4) is equivalent to the aforementioned equation (c).

$$\tan \theta = \cos \varepsilon \times \sin H / (\cos \delta \times \sin \varepsilon - \sin \delta \times \cos \varepsilon \times \cos H) \quad (4)$$

$$= \sin H / (\tan \varepsilon \times \cos \delta - \sin \delta \times \cos H)$$

If both sides of each of equations (1) and (2) are differentiated with respect to t, the following equations (5) and (6) are obtained.

$$-\sin h \times \sin \theta \times dh/dt + \cos h \times \cos \theta \times d\theta/dt = \cos \varepsilon \times \cos H \quad (5)$$

$$-\sin h \times \cos \theta \times dh/dt - \cos h \times \sin \theta \times d\theta/dt = \cos \varepsilon \times \sin \delta \times \sin H \quad (6)$$

If these equations (5) and (6) are solved in terms of dh/dt and dθ/dt, the following equation is obtained:

$$-\sin h \times \sin \theta \times \cos \theta \times dh/dt + \cos h \times \cos \theta \times \cos \theta \times d\theta/dt = \cos \theta \times \cos \varepsilon \times \cos H$$

This equation is equal to the right side of equation (5) multiplied by cos θ.

$$-\sin h \times \cos \theta \times \sin \theta \times dh/dt - \cos h \times \sin \theta \times \sin \theta \times d\theta/dt = \sin \theta \times \cos \varepsilon \times \sin \delta \times \sin H$$

This equation is equal to the right side of equation (6) multiplied by sin θ. If the right side and the left side of the latter equation of the aforementioned two equations are respectively subtracted from the right side and the left side of the former equation, the following equations are obtained:

$$\cos h \times d\theta/dt \times (\cos^2 \theta + \sin^2 \theta) = \cos \theta \times \cos \varepsilon \times \cos H - \cos \theta \times \cos \varepsilon \times \sin \delta \times \sin H$$

$$\cos h \times d\theta/dt = (\cos \delta \times \cos H - \sin \theta \times \sin \delta \times \sin H) \times \cos \varepsilon$$

Accordingly, dθ/dt is expressed by the following equation (7):

$$dθ/dt = (\cos δ \times \cos H - \sin θ \times \sin δ \times \sin H) \times \cos ε/\cos h \quad (7)$$

In addition, the following two equations hold true:

$$-\sin h \times \sin θ \times \sin θ \times dh/dt + \cos h \times \sin θ \times \cos δ \times dθ/dt = \sin θ \times \cos ε \times \cos H$$

$$-\sin h \times \cos θ \times \cos θ \times dh/dt - \cos h \times \cos θ \times \cos θ \times dθ/dt = \cos θ \times \cos ε \times \sin δ \times \sin H$$

The former equation is equivalent to the right side of equation (5) multiplied by sin θ, and the latter equation equivalent to the right side of equation (6) multiplied by cos θ. Therefore, if the right side and the left side of the latter equation of the aforementioned two equations are respectively added to the right side and the left side of the former equation, the following equations are obtained:

$$-\sin h \times dh/dt \times (\sin^2 θ + \cos^2 θ) = \sin θ \times \cos ε \times \cos H + \cos θ \times \cos ε \times \sin δ \times \sin H$$

$$-\sin h \times dh/dt = (\sin θ \times \cos H + \cos θ \times \sin δ \times \sin H) \times \cos ε$$

Accordingly, dh/dt is expressed by the following equation (8):

$$dh/dt = -(\sin θ \times \cos H + \cos θ \times \sin δ \times \sin H) \times \cos ε/\sin h \quad (8)$$

In the spherical triangle ΔZPS, the following two equations hold true according to the spherical law of cosines:

$$\sin A \times \cos(90-h) = \sin θ \times \cos H + \cos θ \times \cos(90-δ) \times \sin H$$

$$\cos A = \cos θ \times \cos H - \sin θ \times \cos(90-δ) \times \sin H$$

These two equations can be modified to obtain the following equations (9) and (10):

$$\sin A \times \sin h = \sin θ \times \cos H + \cos θ \times \sin δ \times \sin H \quad (9)$$

$$\cos A = -\cos θ \times \cos H + \sin θ \times \sin δ \times \sin H \quad (10)$$

If equations (10) and (9) are substituted into equations (7) and (8), respectively, the following equations (11) and (12) that are respectively identical to the aforementioned equations (k) and (j) are obtained.

$$dθ/dt = -\cos A \times \cos ε/\cos h \quad (11)$$

$$dh/dt = -\sin A \times \cos ε \quad (12)$$

In the spherical triangle ΔZPS, the following equation is obtained:

$$\sin(90-h) \times (-\cos A) = \sin(90-ε) \times \cos(90-δ) - \cos(90-ε) \times \sin(90-δ) \times \cos H$$

This equation can be modified to obtain the following equation:

$$-\cos A = (\sin ε \times \cos δ \times \cos H - \cos ε \times \sin δ)/\cos h$$

If this equation is substituted into equation (11), the following equation (13) is obtained.

$$dθ/dt = (\sin ε \times \cos δ \times \cos H - \cos ε \times \sin δ) \times \cos ε/\cos^2 h \quad (13)$$

In the spherical triangle ΔZPS, the following equation is obtained:

$$\cos(90-δ) = \cos(90-ε) \times \cos(90-h) + \sin(90-ε) \times \sin(90-h) \times (-\cos A)$$

This equation can be modified to obtain the following equation (14):

$$(14) \sin δ = \sin ε \times \sin h + \cos ε \times \cos h \times \cos A \quad (g)$$

Consequently, the aforementioned equation (g) is obtained.

Additionally, in the spherical triangle ΔZPS, the following equation is obtained:

$$\cos(90-h) = \cos(90-δ) \times \cos(90-ε) + \sin(90-δ) \times \sin(90-ε) \times \cos H$$

If the following equation "sin(90−δ)=sin(90−h)×sin A/sin H" is substituted into this equation, the following equation is obtained:

$$\cos(90-h) = \cos(90-δ) \times \cos(90-ε) + \sin(90-h) \times \sin A \times \sin(90-ε) \times \cos H/\sin H$$

By modifying this equation, the following equation is obtained:

$$\sin h = \sin δ \times \sin ε + \cos h \times \sin A \times \cos ε/\tan H$$

If equation (14) is substituted into this equation, the following equations are obtained:

$$\sin h = \sin h \times \sin^2 ε + \cos ε \times \sin ε \times \cos h \times \cos A + \cos h \times \sin A \times \cos ε/\tan H$$

$$\cos h \times \sin A \times \cos ε/\tan H = \sin h \times (1-\sin^2 ε) - \cos ε \times \sin ε \times \cos h \times \cos A$$

$$\tan H = \cos h \times \sin A \times \cos ε/(\sin h \times \cos^2 ε - \cos ε \times \sin ε \times \cos h \times \cos A)$$

$$\tan H = \sin A/(\cos ε \times \tan h - \sin ε \times \cos A) \quad (h)$$

Consequently, the aforementioned equation (h) is obtained.

By modifying equation (a), the following equation (15) is obtained:

$$\sin δ = (\sin h - \cos ε \times \cos δ \times \cos H)/\sin ε \quad (15)$$

In the spherical triangle ΔZPS, the following equation is obtained:

$$\sin(90-δ) \times \cos H = \cos(90-h) \times \sin(90-ε) \sin(90-h) \times \cos(90-ε) \times \cos A$$

Therefore, the following equation (16) is obtained:

$$\cos δ \times \cos H = \sin h \times \cos ε - \cos h \times \sin ε \times \cos A \quad (16)$$

If equation (16) is substituted into equation (15), the following equations are obtained, thus being equal to equations (14) or (g).

$$\sin δ = (\sin h - \sin h \times \cos^2 ε + \cos h \times \sin ε \times \cos ε \times \cos A)/\sin ε$$

$$\sin δ = (\sin h \times \sin^2 ε + \cos h \times \sin ε \times \cos ε \times \cos A)/\sin ε$$

$$\sin δ = \sin h \times \sin ε + \cos h \times \cos ε \times \cos A$$

Equation (b) is modified as follows:

$$-\cos A/\sin A = \sin ε/\tan H - \cos ε \times \tan δ/\sin H$$

$$\tan H = \sin ε \times/(-\cos A/\sin A + \cos ε \times \tan δ/\sin H)$$

This equation is modified as follows by substituting an equation "sin H=sin A×sin(90−h)/sin(90−δ)=sin A×cos h/cos δ" into the aforementioned equation.

$$\tan H = \sin ε/(-\cos A/\sin A + \cos ε \times \tan δ \times \cos δ/\sin A \times \cos h)$$

$$\tan H = \sin ε/(-\cos A/\sin A + \cos ε \times \sin δ/(\sin A \times \cos h))$$

$$\tan H = \sin ε \times \sin A/(-\cos A + \cos ε \times \sin δ/\cos h)$$

If this equation is modified by substitution of equation (14) thereinto, the following equations are obtained:

$$\tan H = \sin \epsilon \sin A/(-\cos A + (\cos \epsilon \sin h \times \sin \epsilon + \cos^2 \epsilon \times \cos h \times \cos A)/\cos h)$$

$$\tan H = \sin \epsilon \sin A/(-\cos A + \cos \epsilon \sin \epsilon \tan h + \cos^2 \epsilon \times \cos A)$$

$$\tan H = \sin \epsilon \sin A/(-\cos A \times \sin^2 \epsilon + \cos \epsilon \sin \epsilon \tan h)$$

$$\tan H = \sin A/(-\cos A \times \sin \epsilon + \cos \epsilon \tan h) \quad (h)$$

Consequently, the resultant equation is coincident with the aforementioned equation (h).

In the spherical triangle $\Delta ZPS$, the following equations are obtained:

$$\sin(90-\delta) \times \cos \theta = \cos(90-\epsilon) \times \sin(90-h) + \sin(90-\epsilon) \times \cos(90-h) \times \cos A$$

$$\cos \delta \times \cos \theta = \sin \epsilon \cos h - \cos \epsilon \sin h \times \cos A$$

If this equation is substituted into equation (e), the following equations are obtained:

$$dA/dt = (\sin \epsilon \cos h - \cos \epsilon \sin h \times \cos A)/\cos h$$

$$dA/dt = \sin \epsilon - \cos \epsilon \tan h \times \cos A \quad (i)$$

Consequently, the aforementioned (i) is obtained.

Equation (g) is modified as follows:

$$\sin h \times \sin \epsilon = -\cos h \times \cos \epsilon \cos A + \sin \delta$$

This equation is differentiated with respect to t. However, it is deemed that the latitude $\epsilon$ and the declination $\delta$ at a photographic site are constant.

$$\cos h \times \sin \epsilon dh/dt = \cos \epsilon \sin h \times \cos A \times dh/dt - \cos \epsilon \times \cos h \times \sin A \times dA/dt$$

$$dA/dt = -(\cos h \times \sin \epsilon - \cos \epsilon \sin h \times \cos A) \times dh/dt/(\cos \epsilon \times \cos h \times \sin A)$$

If equation (j) is substituted into this equation, the following equations are obtained:

$$dA/dt = (\cos h \times \sin \epsilon - \cos \epsilon \sin h \times \cos A) \times \sin A \times \cos \epsilon/(\cos \epsilon \cos h \times \sin A)$$

$$dA/dt = \sin \epsilon - \cos \epsilon \tan h \times \cos A \quad (i)$$

thus coinciding with the aforementioned equation (i).

As described above, the azimuth-angle-direction driving speed dA/dt, the elevation-angle-direction driving speed dh/dt and the rotational driving speed dθ/dt that are required to perform the celestial-object auto-tracking photographing operation can be calculated from the declination δ of a target celestial object, the hour angle H of the target celestial object, the photographing azimuth angle A and the photographing elevation angle h via equations (i), (j) and (k).

If the photographing azimuth angle As and the photographing elevation angle hs, which are respectively input from the azimuth angle sensor 33 and the gravity sensor 35, are accurate (high in accuracy), a high precision celestial-object auto-tracking photographing operation is possible. However, if the photographing azimuth angle As and the photographing elevation angle hs are low in accuracy with some errors, a high precision celestial-object auto-tracking photographing operation becomes impossible. Accordingly, in the present embodiment, on the presumption that the photographing azimuth angle A and the photographing elevation angle h of each target celestial object that are obtained from star map data are accurate, an error in the photographing azimuth angle As that is input from the azimuth sensor 33 is calculated as ΔA with reference to the photographing azimuth angle A (i.e., the difference between the photographing azimuth angle A and the photographing azimuth angle As that is input from the azimuth sensor 33 is calculated as ΔA) and an error in the photographing elevation angle hs that is input from the gravity sensor 35 is calculated as Δh with reference to the photographing elevation angle h (i.e., the difference between the photographing elevation angle h and the photographing elevation angle hs that is input from gravity sensor 35 is calculated as Δh) to determine an accurate photographing azimuth angle A (i.e., As+ΔA) and an accurate photographing elevation angle h (i.e., hs+Δh), the errors of which have been corrected, which makes a high precision celestial-object auto-tracking photographing operation possible. If one of the azimuth sensor 33 and the gravity sensor 35 is a high-precision sensor, it is possible to only correct the error caused by the other thereof. In addition, a high precision celestial-object auto-tracking photographing operation is possible if the camera posture ξ is detected and taken into account.

Next, a manner of correcting the photographing azimuth angle As and the photographing elevation angle hs, which are respectively input from the azimuth sensor 33 and the gravity sensor 35 (i.e., a manner of determining the aforementioned errors ΔA and Δh), based on the photographing azimuth angle A and the photographing elevation angle h of each celestial object that are obtained from star map data will be hereinafter discussed more specifically with reference to FIGS. 2 through 4.

With star map data for celestial objects, it can be calculated where a celestial object photographed at the center of the imaging surface 14 (image center), the data of which is contained in the star map data, is located by converting the location of the celestial object to a position on the imaginary imaging surface 14' as shown in FIG. 2. This image center is defined as an arithmetic image center point O. By comparing the locations of a plurality of celestial objects that are determined from the arithmetic image center point O and the star map data with the positions of a plurality of celestial objects on an image obtained from an actual preliminary photographing operation, the amount of deviation therebetween is determined, and from this deviation amount the photographing azimuth angle As and the photographing elevation angle hs that have been input before are corrected. In addition, the camera posture ξ is detected from the deviation amount, and the camera posture of the digital camera 10 is corrected based on this detection manually by the user.

In this preliminary photographing operation, a long time exposure is not performed; instead, a short time exposure is performed so that relatively bright celestial objects are photographed as dots. Accordingly, in this preliminary photographing operation, it is desirable to fully open the diaphragm 103 and increase the photographic sensitivity, e.g., up to the maximum amount.

For the calculation for the amount of deviation in location between each of a plurality of celestial objects in the preliminary image and the corresponding celestial object, the data of which is contained in the star map data, a known pattern matching method or template matching method is used. In this deviation amount calculation, first a coordinate conversion process is performed to compare the locations of a plurality of celestial objects on a preliminary image obtained from the preliminary photographing operation with the locations of a plurality of celestial objects the data on which is contained in the star map data in a common coordinate system. In the illustrated embodiment, the common coordinate system is the aforementioned X-Y coordinate system, in which the center of the preliminary image that corresponds to the center of the imaging surface 14 is defined as the arithmetic image center O and the coordinates (0, 0) thereof is defined as a point of origin of the X-Y coordinate system.

(1-1) Coordinate Conversion for Coordinate Data of Plurality of Celestial Objects of a Preliminary Image The x-y coordinates of each celestial object on an image obtained in the preliminary photographing operation (i.e., on a preliminary image) with the center of this image as a point of origin are calculated.

A predetermined number of celestial objects are required to perform a matching process (the aforementioned pattern matching or template matching) with high precision.

However, if the number of celestial objects for the matching process is too many, the matching process becomes complicated and disadvantages such as increasing the time required for calculation for the matching process occur. Therefore, an appropriate number of celestial objects need to be selected. As a method of selecting celestial objects, it is conceivable to select celestial objects in order of brightness from among the celestial object images contained in a preliminary image. The errors $\Delta A$ and $\Delta h$ can be corrected if the appropriate number of celestial objects is more than one; however, to strike a balance between the accuracy of the correction calculation and the processing speed, it is desirable that the appropriate number of celestial objects be in the range of 3 to 6.

(1-2) Coordinate Conversion for Coordinate Data of a Plurality of Celestial Objects Stored in Star Map Data Star map data is data on the declination and right ascension of each primary celestial object. Coordinates of celestial objects, the data of which is contained in the star map data, are converted to coordinates on the imaging surface 14 with the coordinates (0, 0) of the calculated image center point O defined as a point of origin.

From the date and time information and latitude information $\epsilon$ that are obtained from the GPS unit 31, hour angle H of each celestial object that is obtained by converting the right ascension of the celestial object obtained from the star map data, and the declination $\delta$ of the celestial object obtained from the star map data, the photographing azimuth angle A and photographing elevation angle h of each celestial object (star) at the date and time and photographic site obtained from the GPS unit 31 are calculated according to the following equations:

$$A = \arctan(\sin H/(\cos \epsilon \times \tan \delta - \sin \epsilon \times \cos H))$$

$$h = \arcsin(\sin \epsilon \times \sin \delta + \cos \epsilon \times \cos \delta \times \cos H)$$

Here the hour angle H of a celestial object is expressed by the following equation:

$$H = \theta G - \lambda - A$$

wherein $\theta G$ represents Greenwich sidereal time (identical to the right ascension of any celestial object crossing the Greenwich meridian, at 0 degree longitude), $\lambda$ represents the longitude of the photographic site (the east longitude and the west longitude are represented by "−" and "+", respectively), and 'A' represents the photographing azimuth angle of the celestial object.

Date and time data that is output from the GPS unit 31 is in Greenwich Mean Time and can thus be used as Greenwich sidereal time $\theta G$ without modification.

Next, the difference $\Delta A$ between the photographing azimuth angle As that is input from the azimuth sensor 33 (i.e., the photographing azimuth angle As of the arithmetic image center point O) and the photographing azimuth angle A of a celestial object that is determined from the star map data, and the difference $\Delta h$ between the photographing elevation angle hs that is input from the gravity sensor 35 (i.e., the photographing elevation angle hs of the arithmetic image center point O) and the photographing elevation angle h of the celestial object that is determined from the star map data are calculated from the following equations:

$$\Delta A = A - As$$

$$\Delta h = h - hs$$

To convert the location of each celestial object on an image to the coordinates (x, y) via these equations, the following equations (I) and (II) are used in consideration of the focal length f of the photographing lens 101.

$$X = f \times \tan(\arccos(\sin^2(hs + \Delta h/2) + \cos^2(hs + \Delta h/2) \times \cos(\Delta A))) \quad (I)$$

$$Y = f \times \tan \Delta h \quad (II)$$

Figure 5:
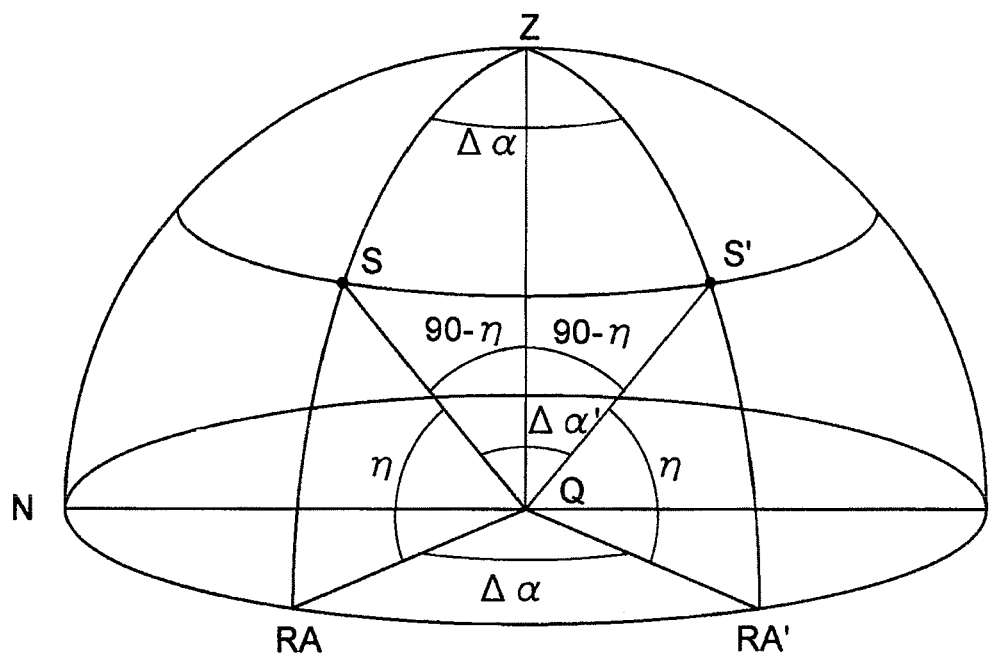
FIG. 5 is a diagram showing a celestial coordinate system for illustrating an astrophotographical principle according to the present invention.

Equations (I) and (II) are calculated in the following manner. First, celestial objects in the sky are regarded to lie on a celestial sphere (hemisphere) shown in FIG. 5. In this drawing, Z designates zenith, and Q designates the center of the celestial sphere (photographic site). On the celestial sphere, if points S and S', which are seen from the center Q of the celestial sphere, have the same elevation angle $\eta$ and are mutually different in azimuth angle by $\Delta \alpha$ are taken on the celestial sphere, the angle between the points S and S' as seen from the center Q of the celestial sphere is $\Delta \alpha'$. When celestial objects are photographed, the amount of movement thereof in the X-direction on a photographed image is proportional to the angle $\Delta \alpha'$. RA and RA' shown in FIG. 5 represent the right ascensions of the points S and S', respectively.

If the elevation angles of the points S and S' are each represented by $\eta$, the following equations are satisfied according to a spherical trigonometry in a spherical triangle ZSS':

$$\cos \Delta \alpha' = \cos^2(90 - \eta) + \sin^2(90 - \eta) \times \cos \Delta \alpha \quad (III)$$

$$= \sin^2(\eta) + \cos^2(\eta) \times \cos \Delta \alpha$$

$$\Delta \alpha' = \arccos(\sin^2(\eta) + \cos^2(\eta) \times \cos(\Delta \alpha))$$

Figure 6:
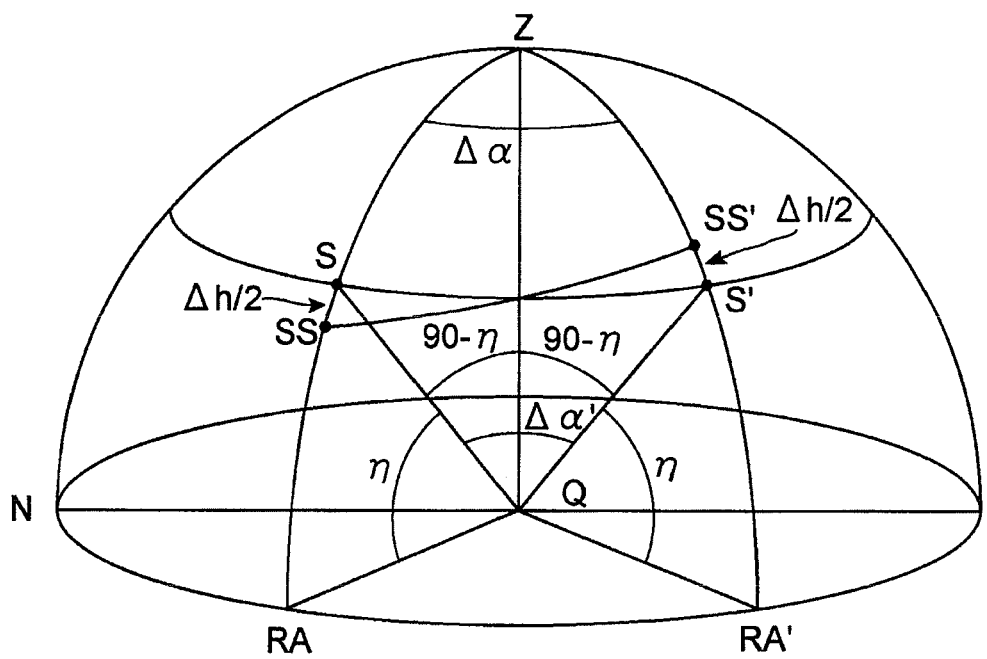
FIG. 6 is a diagram showing a celestial coordinate system for illustrating another astrophotographical principle according to the present invention.

Next, if a point SS (the elevation angle $\eta - \Delta h/2$) and a point SS' (the elevation angle $\eta + \Delta h/2$) that are mutually different in elevation angle are taken on the celestial sphere (hemisphere) shown in FIG. 6, the amount of movement of the point SS to the point SS' in the X-direction (i.e., the amount of movement thereof in the horizontal direction) on a photographed image is identical to the amount of movement of the point S to the point S' in the X-direction at the elevation angle n that is the median point between the elevation angles of the points SS and SS'. Accordingly, the amount of movement of the point SS to the point SS' in the X-direction is proportional to $\Delta \alpha'$ shown in equation (III).

If it is assumed that the elevation angle of the point SS shown in FIG. 6 is determined as the photographing elevation angle hs by the gravity sensor 35, the following equation is obtained:

$$hs = \eta - \Delta h/2$$

Accordingly, by substituting an equation "η=hs+Δh/2" that is a modification of the aforementioned equation into equation (III), the following equation is satisfied:

$$\Delta\alpha' = \arccos(\sin^2(hs+\Delta h/2) + \cos^2(hs+\Delta h/2) \times \cos(\Delta\alpha)) \quad (IV)$$

To convert the location of the above celestial object to an amount of coordinate movement (ΔX, ΔY) on an image (the imaging surface 14), the following equations in which the focal length f of the photographing lens 101 is taken into consideration are used.

$$\Delta X = f \times \tan\Delta\alpha'$$
$$= f \times \tan(\arccos(\sin^2(hs + \Delta h/2) + \cos^2(hs + \Delta h/2) \times \cos(\Delta\alpha)))$$
$$\Delta Y = f \times \tan\Delta h$$

Since the difference Δα in azimuth angle that is shown in FIGS. 5 and 6 is the same as the difference (error) ΔA in azimuth anglein equation (i), the aforementioned equations (I) and (II) are obtained from equation Δα=ΔA.

To perform a coordinate conversion on the coordinates of each of an infinite number of celestial objects takes time and increases the burden on the processing. Accordingly, a range of celestial objects to be counted for coordinate conversion is determined from the focal length information f of the photographing lens 101 and the maximum errors output from the azimuth sensor 33 and the gravity sensor 35. For instance, it is conceivable for the celestial objects on the star chart to be divided into several blocks on each of a certain range of right ascension and a certain range of declination, and that the above described coordinate conversion is performed only on the coordinates of celestial objects in the blocks including the right ascension and declination obtained by inverse operation from the photographing azimuth angle As and the photographing elevation angle hs of the arithmetic image center point O and the celestial objects in the blocks around those blocks.

By comparing the coordinates (X10, Y10), (X11, Y11), . . . of celestial objects that are calculated in the aforementioned coordinate conversion (1-1) from a preliminary image with the coordinates (X20, Y20), (X21, Y21), . . . of the corresponding celestial objects that are calculated in the aforementioned coordinate conversion (1-2) from star map data and performing the matching process, the amount of positional deviations of each celestial object in the preliminary image from the corresponding celestial object in the star map in the horizontal direction (X-direction) and vertical direction (Y-direction) are calculated as ΔX and ΔY, respectively. These deviation amounts ΔX and ΔY are the deviation amounts of the entire image in the X-direction and the Y-direction as shown in FIG. 4 and are comprehensively calculated from the deviation amounts of a plurality of celestial objects used for the matching process.

From these deviation amounts ΔX and ΔY, the amount of deviation Δh of the photographing elevation angle hs (obtained from the gravity sensor 35 upon the preliminary photographing operation being actually performed) from the arithmetic image center point O and the amount of deviation ΔA of the photographing azimuth angle As (obtained from the azimuth sensor 33 upon the preliminary photographing operation being actually performed) from the arithmetic image center point O can be calculated from the following equations:

$$\Delta h = \arctan(\Delta Y/f)$$

$$\Delta A = \arccos((\cos(\arctan(\Delta X/f)) - \cos^2(hs + \Delta h/2))/\cos^2(hs + \Delta h/2))$$
$$= \arccos((\cos(\arctan(\Delta X/f)) - \cos^2(hs + \arctan(\Delta Y/f)/2))/$$
$$\cos^2(hs + \arctan(\Delta Y/f)/2))$$

The amount of deviation ΔA of the photographing azimuth angle and the amount of deviation Δh of the photographing elevation angle are correction amounts for correcting the photographing azimuth angle As and the photographing elevation angle hs that are input from the azimuth angle sensor 33 and the gravity sensor 35, respectively.

As described above, by determining the correction amounts ΔA and Δh from the results of the preliminary photographing operation, calculating the accurate photographing azimuth angle A (i.e., As+ΔA) and the accurate photographing elevation angle h (i.e., hs+Δh) by correcting the photographing azimuth angle As and the photographing elevation angle hs, and performing the celestial-object auto-tracking photographing operation based on the accurate photographing azimuth angle A and the accurate photographing elevation angle h, celestial objects can be photographed as dots.

Upon the matching process (the aforementioned pattern matching or template matching) for matching celestial objects on a preliminary image with celestial objects, the data of which is contained in the star map data, a deviation amount (camera posture ξ) in rotational component is also determined, so that it is possible to determine the angle of rotation of the camera body 11 (the image sensor 13) about the optical axis LO from the reference position thereof, e.g., to determine the inclination of the long-side direction of the image sensor 13 from the horizontal direction (X-direction) when the position of the rectangular image sensor 13 in which the long-side direction thereof coincides with the horizontal direction (X-direction) is taken as a reference position. If this inclination with respect to the horizontal direction is corrected, the operation of the image sensor drive unit 15 can be controlled more correctly.

Regarding the rotational control for the image sensor 13, the deviation amount (camera posture e) in rotational component can also be corrected by correcting the photographing azimuth angle As and the photographing elevation angle hs and again performing the above described calculations based on the photographing azimuth angle A and the photographing elevation angle h, the errors of which have been corrected, and accordingly, appropriate control for the rotational driving of the image sensor 13 by the image sensor drive unit 15 becomes possible.

[Method of Calculating Photographing Azimuth Angle 'A' and Photographing Elevation Angle 'h' of Each Celestial Object (Star)]

The method of calculating the photographing azimuth 'A' and the photographing elevation angle 'h' of each celestial object (star) in the aforementioned coordinate conversion (1-2) will be discussed in further detail hereinafter.

Modified Julian Date (MJD) and Greenwich sidereal time are standard date and time in astronomical observation, thus being converted to local sidereal time at a photographic site.

[Modified Julian Date (Quasi-Julian Date)]

Modified Julian date is defined as MJD and determined by the following equation:

$$MJD = int(365.25Y) + int(Y/400) - int(Y/100) + int(30.59(M-2)) + D - 678912$$

Year, month and day of Gregorian Calendar (as from Oct. 15, 1582 AD) are defined as Y, M and D, respectively. However, January and February are set as M=13 and M=14, respectively, and Y is set to be equal to Y−1 (Y=Y−1).

In addition, Greenwich Mean Time (GMT) is used as a reference time. Accordingly, in the case of astrophotography with the digital camera 10 in Japan, GMT is 9 hours behind Japanese Standard Time (JST).

For instance, if the current time is 0 AM on Feb. 2, 2009 in Japan time, Modified Julian date is determined as follows:

MJD=int(365.25×2008)+int(2008/400)−int(2008/100)+int(30.59×12)+2−678912, and hence, MJD=55047.47 h However, this equation is calculated using time values as those in Japan time.
Date, hour and minutes are set to 4, 20 and 20, respectively (Date=4, time=20 and minute=20).
[Greenwich Sidereal Time]
Greenwich Sidereal Time is defined as θG and determined by the following equation:

θG=24h×(0.67239+1.00273781×(MJD−40000.0))

This equation is based upon equinox 2000.0.
Greenwich Sidereal Time is identical to the right ascension of any celestial object crossing the Greenwich meridian, at 0 degree longitude.

Greenwich Sidereal Time θG: only values thereof (0.67239+1.00273781×(MJD−40000.0)) to the right of the decimal point are used.

Accordingly, the Greenwich Sidereal Time θG of the aforementioned input time (0 AM on Feb. 2, 2009 in Japan time) is as follows:

θG=8.202 h.

[Local Sidereal Time]
If local sidereal time is defined as θ, the following equation is obtained:

θ=θG−λ

This is identical to the right ascension of any celestial object crossing the local meridian, at λ (=longitude of the photographic site; the east longitude and the west longitude are represented by "−" and "+", respectively).

However, the east longitude is 139.6915, and the local sidereal time θ is 17.514 h.
[Hour Angle]
The hour angle H of a celestial object is expressed by the following equation:

H=θ−α wherein θ represent the local sidereal time, and
α represents the right ascension of the celestial object.
The right ascension of the celestial object is expressed as follows:

| 21.843 | H = | −4.329 h | −28.329 h |
| | | −64.931 deg | −424.931 deg |

[Photographing Azimuth Angle and Photographing Elevation Angle]
In the case of astrophotography with a celestial object S positioned at the center of the imaging surface 14, the calculated photographing azimuth angle A and elevation angle h of the celestial object S are determined according to the following equations from the latitude information ε (obtained from the GPS unit 31), the hour angle H of the celestial object S obtained by converting the right ascension of the celestial object S obtained from star map data, and the declination δ of the celestial object S obtained from star map data.

$A = \arctan(\sin H/(\cos \varepsilon \tan \delta - \sin \varepsilon \cos H))$ $h = \arcsin(\sin \varepsilon \sin \delta + \cos \varepsilon \cos \delta \times \cos H)$ From star map data, data on principal celestial objects is shown below by way of example. Table 1 below shows the right ascensions and declinations of Vega, Sirius, Cappella, Arcturus, Deneb, Mizar and Jupiter, abstracted from star map data at 21:00, Jul. 21, 2009 in Greenwich Sidereal Time.

TABLE 1

| | RIGHT ASCENSION | DECLINATION | RIGHT ASCENSION | DECLINATION |
|---|---|---|---|---|
| Vega | 18 h 36 m 56.3 s | +38° 47' 01" | 18.616 h | 38.784° |
| Sirius | 06 h 45 m 08.9 s | −16° 42' 58" | 6.752 h | −15.284° |
| Cappella | 05 h 16 m 41.4 s | +45° 59' 53" | 5.278 h | 45.998° |
| Arcturus | 14 h 15 m 39.7 s | +19° 10' 56" | 14.261 h | 19.182° |
| Deneb | 20 h 41 m 25.9 s | +45° 16' 49" | 20.691 h | 45.280° |
| Mizar | 13 h 23 m 55.5 s | +54° 55' 31" | 13.399 h | 54.925° |
| Jupiter | 21 h 50 m 35.0 s | −14° 8' 1" | 21.843 h | −14.134° |

[Calculation Result]
Table 2 below shows the calculation results of the date and time, hour angle h, declination of each celestial object when Vega, Sirius, Cappella and Arcturus are located at 139.6915 degrees of east longitude, based on the data shown in Table 1.

TABLE 2

| | Year/Month/Day | Japan Time | East Longitude[°] | Hour | Declination[°] |
|---|---|---|---|---|---|
| Vega | 2008 Sep. 30 | 20:00 | 139.6915 | 2.327 | 38.784 |
| Vega | 2008 Oct. 02 | 20:00 | 139.6915 | 2.458 | 38.784 |
| Sirius | 2009 Feb. 02 | 22:26 | 139.6915 | 0.843 | −15.284 |
| Sirius | 2009 Mar. 17 | 20:25 | 139.6915 | 1.646 | −15.284 |
| Cappella | 2009 Mar. 17 | 20:33 | 139.6915 | 3.254 | 45.998 |
| Arcturus | 2009 Mar. 17 | 20:40 | 139.6915 | −5.611 | 19.182 |

Table 3 below shows the calculation results of the date and time, hour angle h, declination of each celestial object when Mizar, Vega, Deneb and Jupiter are located at 139.6915 degrees, east longitude on Jul. 21, 2009 in Japan Time.

TABLE 3

| | Year/Month/Day | Japan Time | East Longitude[°] | Hour | Declination[°] |
|---|---|---|---|---|---|
| Mizar | 2009 Jul. 21 | 20:30 | 139.6915 | 3.363 | 54.925 |
| Vega | 2009 Jul. 21 | 20:45 | 139.6915 | −1.604 | 38.784 |
| Deneb | 2009 Jul. 21 | 21:00 | 139.6915 | −3.428 | 45.280 |
| Jupiter | 2009 Jul. 21 | 21:15 | 139.6915 | −4.329 | −14.134 |

Table 4 below shows the calculation results of the date and time, hour angle h, declination of each celestial object when Mizar, Vega, Deneb and Jupiter are located at 139.6915 degrees of east longitude on Aug. 4, 2009 in Japan Time.

TABLE 4

|  | Year/Month/Day | Japan Time | East Longitude[°] | Hour | Declination[°] |
|---|---|---|---|---|---|
| Mizar | 2009 Aug. 4 | 19:35 | 139.6915 | 3.364 | 54.925 |
| Vega | 2009 Aug. 4 | 19:50 | 139.6915 | −1.603 | 38.784 |
| Deneb | 2009 Aug. 4 | 20:05 | 139.6915 | −3.427 | 45.280 |
| Jupiter | 2009 Aug. 4 | 20:20 | 139.6915 | −4.329 | −14.134 |

In the above described manner, data on principal celestial objects, some of which may be photographed in a single picture frame when astrophotography is carried out, can be converted into east longitudes, hour angles and declinations of the celestial objects at the time of photographing at a photographic site. Conversely, the photographing azimuth angle A and the photographing elevation angle h can be determined from data on a celestial object located at the center of the imaging surface 14.

Figure 8:
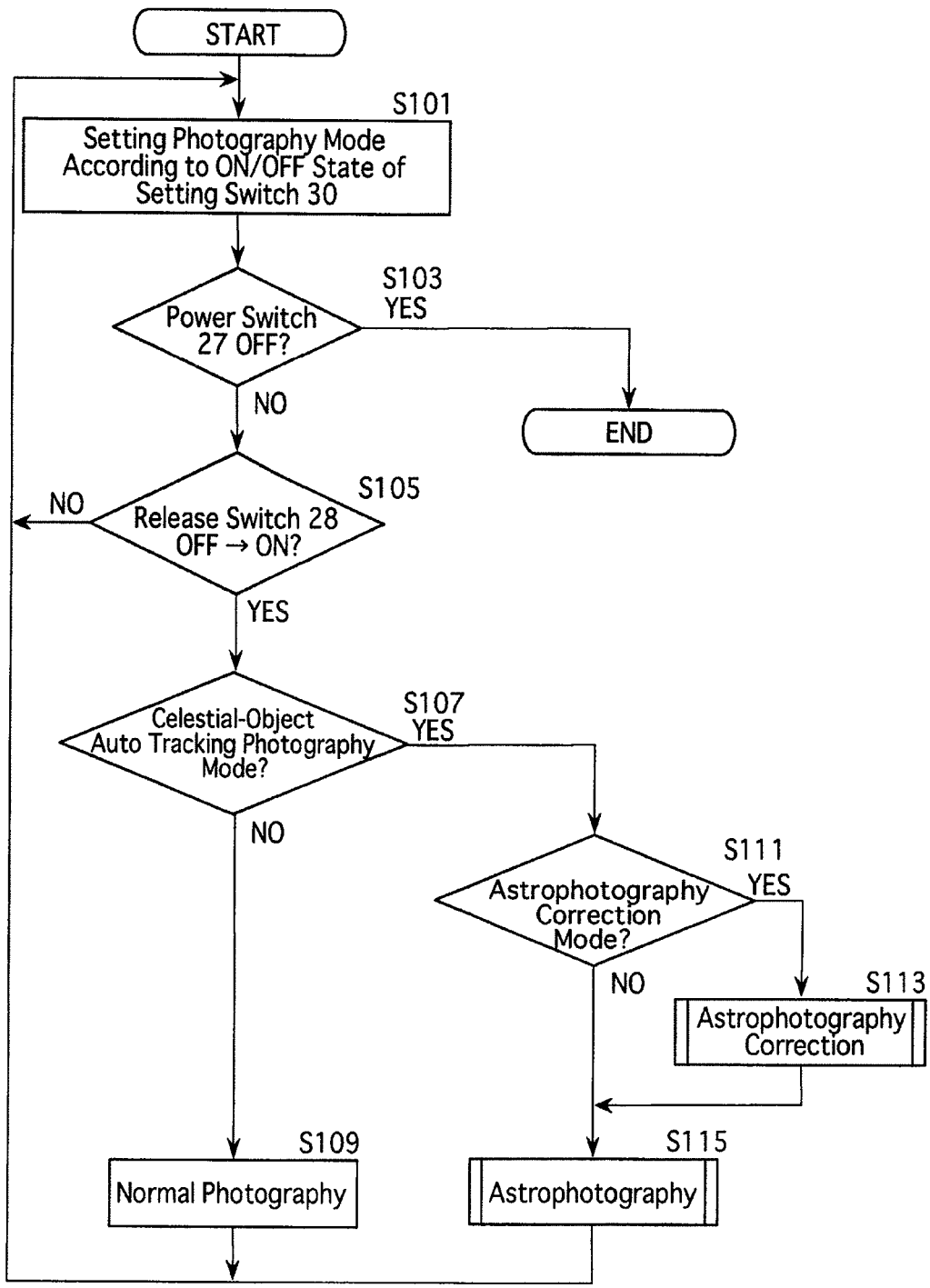
FIG. 8 is a flow chart showing a main process performed when a picture is taken by the digital camera in either a normal photography mode or an astrophotography mode (celestial-object auto tracking photography mode)
Figure 9:
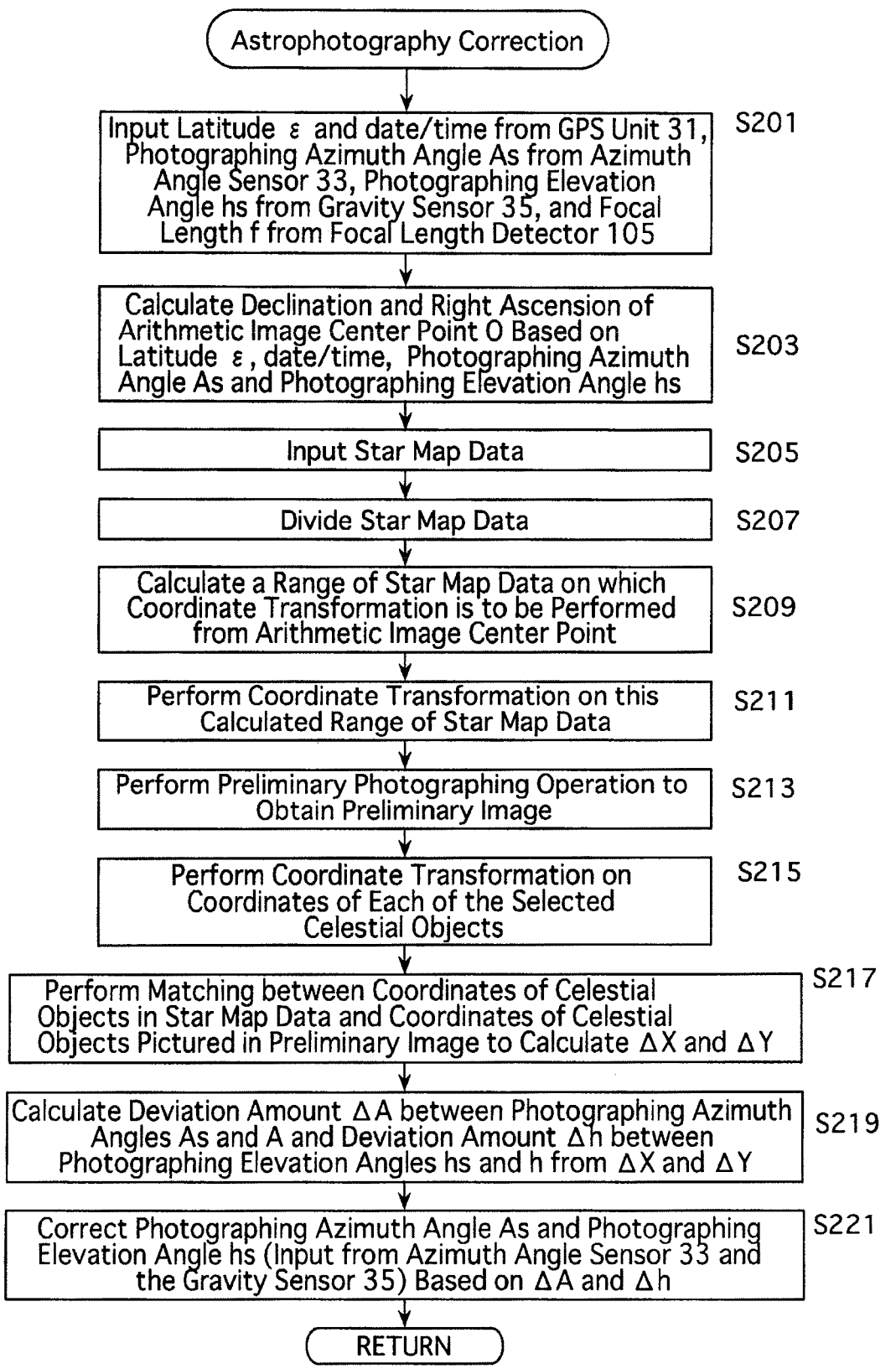
FIG. 9 is a flow chart showing a series of operations performed in the astrophotograph correction process (step S113) shown in FIG. 8 that includes a preliminary photographing operation.
Figure 10:
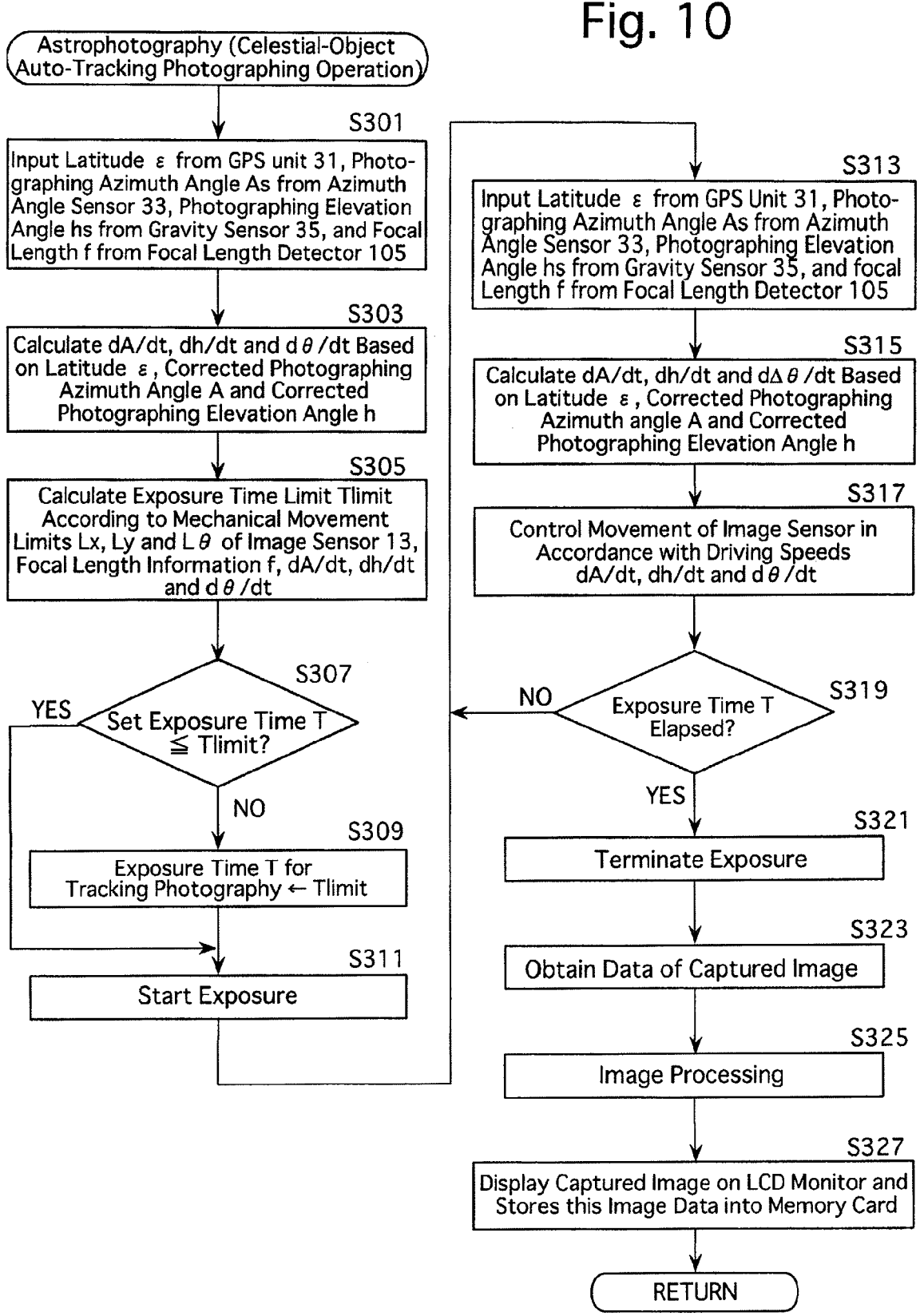
FIG. 10 is a flow chart showing a series of operations performed in the celestial-object auto-tracking photographing operation (actual photographing operation) (step S115) shown in FIG. 8.
Figure 11:
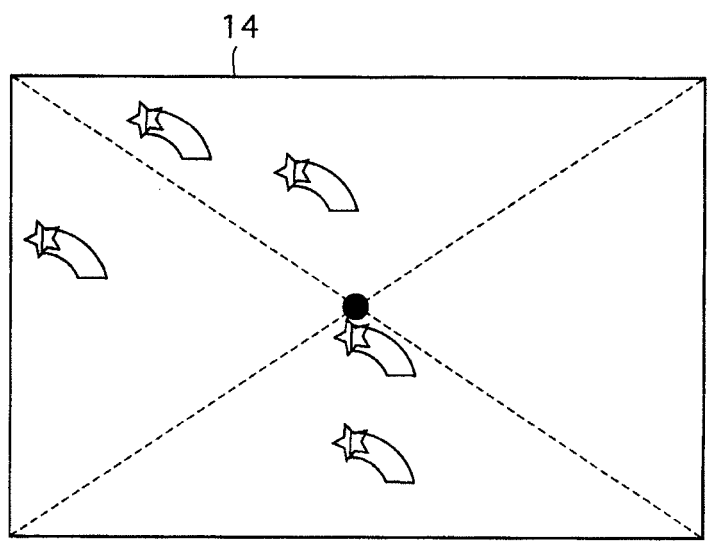
FIG. 11 is a diaphragm showing an image photographed in the astrophotography mode with an error in photographing azimuth angle and photographing elevation angle.

Astrophotography (celestial-object auto tracking photography) using the digital camera 10 will be hereinafter discussed with reference to the flow charts shown in FIGS. 8 through 10. As shown in FIG. 8, upon the release switch 28 being turned ON with the power switch 270N, a normal photography (normal exposure operation) is performed if the digital camera 10 is in a normal photography mode (not the celestial-object auto tracking photography mode) that is set by turning OFF the setting switch 30 (step S101, NO at step S103, YES at step S105, NO at step S107, and step S109). Control ends upon the power switch 27 being turned OFF (YES at step S103, END). No photographing operation is performed unless the release switch 28 is turned ON (NO at step S105).

In a state where the power switch 27 is in the ON state and the digital camera 10 is in the celestial-object auto tracking photography mode that is set by the setting switch 30 (S101, NO at step S103), the celestial-object auto-tracking photographing operation according to the present embodiment is performed upon the release switch 28 being turned ON with a target celestial object(s) or star(s) captured on the image sensor 13 (YES at step S105, YES at step 107).

If astrophotography is carried out with the digital camera 10 not in an astrophotography correction mode (i.e., the celestial-object auto tracking photography mode in which star map data is used) (NO at step S111, S115), it is sometimes the case that the image sensor 13 (the imaging surface 14) cannot smoothly follow the diurnal motion of celestial objects; consequently, the resultant images thereof become linearly or curvilinearly elongated images.

On the other hand, if astrophotography is carried out with the digital camera 10 in the astrophotography correction mode (the celestial-object auto tracking photography mode in which star map data is used) (YES at step S111), an astrophotography correction process is performed (step S113) and subsequently the celestial-object auto-tracking photographing operation (actual photographing operation) is performed (step S115). In the astrophotography correction process (step S113), a more accurate photographing azimuth angle A and a more accurate photographing elevation angle h are obtained by correcting the photographing azimuth angle As and the photographing elevation angle hs that are input from the azimuth angle sensor 33 and the gravity sensor 35, respectively. In the celestial-object auto-tracking photographing operation (step S115), the CPU 21 performs an exposure operation (photographing operation) while controlling parallel movement of the image sensor 13 and rotational movement of the image sensor 13 based on the accurate (corrected) photographing azimuth angle information A and the accurate (corrected) photographing elevation angle information h.

[Astrophotography Correction Process]

The astrophotography correction process in the present embodiment that is performed at step S113 will be hereinafter discussed in detail with reference to the flow chart shown in FIG. 9.

In the astrophotography correction process, first the CPU 21 inputs the latitude information f and the date/time information (Greenwich mean time information) from the GPS unit 31, the photographing azimuth angle information As from an azimuth angle sensor 33, the photographing elevation angle information hs from the gravity sensor 35, and the focal length information f from the focal length detector 105 (step S201). Subsequently, the CPU 21 calculates the declination and right ascension of the arithmetic image center point O based on the input latitude information ε, date/time information (Greenwich mean time information), photographing azimuth angle information As and photographing elevation angle information hs (step S203).

The CPU 21 inputs star map data from the memory card 37 (step S205). The CPU 21 divides the star map data, which is input from the memory card 37, into different sections based on the input latitude information ε, date/time information (Greenwich Mean Time information), photographing azimuth angle information As, and photographing elevation angle information hs and focal length information f; and the CPU 21 selects star map data of one section from among the different sections (step S207). Although the star map data input to the CPU 21 from the memory card 37 is divided after being input to the CPU 21 in the present embodiment, it is possible to establish the aforementioned sections based on the input latitude information εdate/time information (Greenwich mean time information), photographing azimuth angle information As and photographing elevation angle information hs before inputting star map data to the CPU 21 from the memory card 37 so that only the star map data from the selected section is input. In this case, the amount of the star map data input to the CPU 21 can be reduced.

Subsequently, the CPU 21 calculates a range of the input star map data, of which the above described coordinate conversion is to be performed, from the arithmetic image center point O (step S209), and the coordinate conversion is performed on the star map data in this calculated range (step S211). FIG. 2 shows an example of celestial objects, the data of which is contained in the star map data on which the coordinate conversion has been performed.

Subsequently, the CPU 21 performs the preliminary photographing operation to obtain a preliminary image (step S213). In this preliminary photographing operation, a short time exposure is performed so that celestial objects are photographed as dots. For instance, the exposure time can be reduced by fully opening the diaphragm 103 and increasing the photographic sensitivity to the maximum. The CPU 21 selects more than one celestial object from among the celestial objects photographed in the obtained preliminary image and performs the coordinate conversion on the coordinates of each of the selected celestial objects (step S215). FIG. 3 shows an example of celestial objects pictured in a preliminary image on which the coordinate conversion has been performed.

Subsequently, the CPU 21 compares the coordinates of celestial objects the data on which is contained in the star map data on which the coordinate conversion has been performed with the coordinates of celestial objects pictured in the preliminary image on which the coordinate conversion has been performed, and performs the matching process to calculate the amount of positional deviations of each celestial object from the corresponding celestial object in the star map data in the horizontal direction (X-direction) and vertical direction (Y-direction) as ΔX and ΔY, respectively (step S217). Additionally, the CPU 21 detects the camera posture ξ. FIG. 4 shows these deviation amounts ΔX, ΔY and ξ.

Subsequently, from the deviation amounts ΔX and ΔY thus calculated, the CPU 21 calculates the amount of deviation (error) between the photographing azimuth angle As that is input from the azimuth angle sensor 33 and the corresponding photographing azimuth angle A that is determined from the star map data as ΔA and calculates the amount of deviation (error) between the photographing elevation angle hs that is input from the gravity sensor 35 and the corresponding photographing elevation angle h that is determined from the star map data as Δh (step S219). Thereafter, based on the deviation amounts ΔA and Δh thus calculated, the CPU 21 corrects the photographing azimuth angle As and the photographing elevation angle hs that are input from the azimuth angle sensor 33 and the gravity sensor 35, respectively (step S221). Namely, the CPU 21 calculates the accurate photographing azimuth angle A (i.e., As+ΔA) and the accurate photographing elevation angle h (i.e., hs+Δh) the detection errors of which have been corrected.

[Celestial-Object Auto-Tracking Photographing Operation]

The celestial-object auto-tracking photographing operation (step S115) in the present embodiment will be hereinafter discussed in detail with reference to the flow chart shown in FIG. 10.

In the celestial-object auto-tracking photographing operation, first the CPU 21 inputs the latitude information ε from the GPS unit 31, the photographing azimuth angle information As from the azimuth angle sensor 33, the photographing elevation angle information hs from the gravity sensor 35, and the focal length information f from the focal length detector 105 (step S301).

Subsequently, the CPU 21 calculates the accurate photographing azimuth angle A (i.e., As+ΔA) and the accurate photographing elevation angle h (i.e., hs+Δh) that are obtained by correcting the photographing azimuth angle As and the photographing elevation angle information hs (that are input from the azimuth sensor 33 and the gravity sensor 35) with the deviation amounts ΔA and Δh, respectively. Thereupon, the CPU 21 calculates the azimuth-angle-direction driving speed dA/dt, the elevation-angle-direction driving speed dh/dt and the rotational driving speed dθ/dt based on the corrected photographing azimuth angle A and the corrected photographing elevation angle h and the latitude information ε that is input from the GPS unit 31 (step S303). As described above, the azimuth-angle-direction driving speed dA/dt, the elevation-angle-direction driving speed dh/dt and the rotational driving speed dθ/dt are data for moving the image sensor 13 in the X-direction, data for moving the image sensor 13 in the Y-direction and data for rotating the image sensor 13 about the center thereof, respectively.

Subsequently, the CPU 21 calculates a longest exposure time (exposure time limit) Tlimit according to the calculated azimuth-angle-direction driving speed dA/dt, elevation-angle-direction driving speed dh/dt and rotational driving speed dθ/dt, the focal length information f that is input from the focal length detector 105 and mechanical movement limits Lx, Ly and Lθ in the range of movement of the image sensor 13 that is moved by the image sensor drive unit 15 (step S305).

Subsequently, the CPU 21 determines whether or not the exposure time T, which is arbitrarily set by the user, is within (less than or equal to) the longest exposure time Tlimit that is calculated at step S305 (step S307). If the exposure time T is determined at step S307 as being within the longest exposure time Tlimit (if YES at step S307), the CPU 21 sets the exposure time T as an exposure time for the celestial-object auto-tracking photographing operation. On the other hand, if the exposure time T is determined at step S307 as exceeding the longest exposure time Tlimit (if NO at step S307), the CPU 21 sets the longest exposure time Tlimit as an exposure time for the celestial-object auto-tracking photographing operation (step S309). Subsequently, the CPU 21 controls the operation of a shutter (not shown) so that the shutter opens for the set exposure time to start capturing an image via the image sensor 13 (step S311). Although an image is normally captured with the diaphragm 103 fully open, the aperture size of the diaphragm 103 can be arbitrarily set by the user.

Subsequently, until the set exposure time T elapses, the CPU 21 continues the exposure operation while controlling the linear movement and the rotational movement of the image sensor 13 in accordance with the calculated azimuth-angle-direction driving speed dA/dt, elevation-angle-direction driving speed dh/dt and rotational driving speed dθ/dt (step S317, NO at step S319). This makes capturing of a still image of a celestial object or objects possible in a state where each celestial object appears stationary in long exposure astrophotography simply by making an exposure with the digital camera 10 fixed with respect to the ground (earth). During this exposure time, the CPU 21 calculates and updates the azimuth-angle-direction driving speed dA/dt, the elevation-angle-direction driving speed dh/dt and the rotational driving speed dθ/dt based on the latitude information ε, the photographing azimuth angle information As and the photographing elevation angle information hs that are input from the GPS unit 31, the azimuth angle sensor 33 and the gravity sensor 35, respectively (steps S313 and S315).

Subsequently, after a lapse of the exposure time T (YES at step S319), the CPU 21 closes the shutter (not shown) to terminate the exposure operation (step S321). Thereafter, the CPU 21 reads out image data on the captured image from the image sensor 13 (step S323) and performs image processing operations such as a white balance adjustment operation and an image processing operation for converting the format type into a predetermined type of format (step S325). Lastly, the CPU 21 causes the image data on the captured image, on which the aforementioned image processing operations have been performed, to be displayed on the LCD monitor 23, stores this image data into the memory card 25 as an image file of a predetermined format (step S327), and control returns.

As described above, the above described method of automatically tracking and photographing celestial objects according the present invention includes the following operations: inputting latitude information, photographing azimuth angle information and photographing elevation angle information of a photographic apparatus; inputting star map data of a certain range including data on a location of a celestial object which is to be photographed from the latitude information, the photographing azimuth angle information and the photographing elevation angle information; calculating a deviation amount between the location of the celestial object that is pictured in an image obtained by the photographic apparatus when a preliminary photographing operation is performed and the location of the celestial object data of which is included in input the star map data; correcting at least one of the photographing azimuth angle information and the photographing elevation angle information using the deviation amount to obtain corrected photographing azimuth angle information and corrected photographing elevation angle information; and performing a celestial-object auto-tracking photographing operation based on the corrected photographing azimuth angle information and the corrected photographing elevation angle information. With this method of automatically tracking and photographing celestial objects, corrected accurate photographing azimuth angle information and corrected accurate photographing elevation angle information can be obtained even if the azimuth sensor and the gravity sensor are low in detection accuracy. Accordingly, with the corrected accurate photographing azimuth angle information and the corrected accurate photographing elevation angle information, a digital camera (photographic apparatus) that employs this method of automatically tracking and photographing celestial objects can perform the celestial-object auto-tracking photographing operation with high precision. The above descriptions have been given with reference to the long-side direction of a rectangular image sensor as the horizontal direction (X-direction) and an X-Y coordinate system the X-axis (X-direction) and Y-axis (Y-direction) of which respectively correspond to the long-side direction and the short-side direction of the rectangular image sensor; however, in the case where the detection value of the camera posture is other than zero, a higher precision celestial-object auto-tracking photographing operation is possible if a similar process is performed with a correction for an inclination of the X-Y coordinate at the inclination angle made to the photographing azimuth angle information A and the photographing elevation angle information h.

Although the digital camera 10 is equipped with the image sensor drive unit 15 that moves the image sensor 13 in directions orthogonal to the optical axis Z and rotates about an axis parallel to the optical axis Z, the digital camera according to the present invention can be alternatively configured as a combination of an image shake corrector (anti-shake apparatus) provided in the photographing lens 101 with an image shake correcting lens for moving object images on the image sensor 13 and an image sensor rotating mechanism for rotating the image sensor 13. Accordingly, a celestial object(s) can be automatically tracked and photographed while moving at least one of a predetermined imaging area of the imaging surface 14 of the image sensor (image pickup device) 13 and the image forming position of a celestial object image based on the calculated moving speed and rotating speed of the celestial object image. This is achieved by the above-mentioned image shake corrector (anti-shake apparatus) provided in the photographing lens 101 linearly moving image forming position of the celestial object image(s) that is imaged onto the imaging surface 14 of the image sensor 13 while the image sensor drive unit 15 rotates the image sensor 13 about an axis parallel to the optical axis Z.

In addition, a digital camera has been described above as a camera according to the present invention; however, the present invention is applicable to not only lens-interchangeable SLR digital cameras and lens shutter type compact digital cameras, but also general photographic apparatus in which an image sensor (image pickup device) can be driven to move in any given direction orthogonal to a photographing optical axis and rotate in a plane orthogonal to the photographing optical axis.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A method of automatically tracking and photographing an arbitrarily-selected celestial object, comprising:
    performing a preliminary photographing operation by directing a photographic apparatus toward the celestial object;
    inputting latitude information, photographing azimuth angle information and photographing elevation angle information of said photographic apparatus obtained during said preliminary photographing operation;
    inputting star map data of a range corresponding to the input said latitude information, said photographing azimuth angle information and said photographing elevation angle information;
    calculating a deviation amount between a location of the celestial object that is imaged in a preliminary image obtained by said preliminary photographing operation and a location of the celestial object which is defined in the input said star map data;
    correcting at least one of said photographing azimuth angle information and said photographing elevation angle information using said deviation amount; and
    performing a celestial-object auto-tracking photographing operation based on the corrected said at least one of said photographing azimuth angle information and said photographing elevation angle information.

2. A method of automatically tracking and photographing an arbitrarily-selected celestial object which moves relative to a photographic apparatus due to diurnal motion so that an image of the celestial object, which is formed on an imaging surface of an image sensor via a photographing optical system of said photographic apparatus, becomes stationary relative to a predetermined imaging area of said imaging surface of said image sensor during a celestial-object auto-tracking photographing operation, said method comprising:
    obtaining a preliminary image by performing a preliminary photographing operation using said photographic apparatus, which is directed toward the celestial object;
    calculating a location of the celestial object that is imaged in the obtained said preliminary image;
    inputting photo date information, latitude information, photographing azimuth angle information and photographing elevation angle information of said photographic apparatus obtained during said preliminary photographing operation;
    inputting star map data of a range corresponding to the input said photo date information, said latitude information, said photographing azimuth angle information and said photographing elevation angle information;
    calculating a deviation amount, in a predetermined coordinate system, between the calculated said location of the celestial object that is imaged in said obtained preliminary image and said location of the celestial object which is defined in the input said star map data;
    correcting at least one of said photographing azimuth angle information and said photographing elevation angle information using said deviation amount; and
    performing said celestial-object auto-tracking photographing operation based on corrected said at least one of said photographing azimuth angle information and said photographing elevation angle information.

3. The method according to claim 2, further comprising:
    calculating a posture of said photographic apparatus that is achieved when said preliminary photographing operation is performed using said deviation amount,
    wherein said performing of said celestial-object auto-tracking photographing operation comprises performing said celestial-object auto-tracking photographing operation based on said posture of said photographic apparatus.

4. The method according to claim 2, further comprising:
inputting information on the focal length of said photographing optical system,
wherein said calculating of said location of the celestial object comprises calculating said location of the celestial object in said predetermined coordinate system in said preliminary image from the focal length information, said date information, said latitude information, said photographing azimuth angle information and said photographing elevation angle information.

5. The method according to claim 2, wherein said photographic apparatus comprises an azimuth angle sensor and a gravity sensor, from which said photographing azimuth angle information and said photographing elevation angle information are input, respectively.

6. The method according to claim 2, wherein said photographic apparatus comprises a GPS unit, from which said latitude information is input.

7. The method according to claim 2, wherein said star map data includes data on right ascensions and declinations of celestial objects including the celestial object which is to be photographed.

8. The method according to claim 7, wherein said predetermined coordinate system is an X-Y coordinate system on said imaging plane,
wherein said method further comprises:
converting coordinates of the celestial object data which is provided in said star map data to coordinates on said imaging plane; and
calculating a photographing azimuth angle and a photographing elevation angle of each of the celestial objects from said latitude information, hour angles of the celestial objects, which are obtained by converting said right ascensions, and said declinations of the celestial objects according to the following equations:

$A = \arctan(\sin H/(\cos \epsilon \tan \delta - \sin \epsilon \cos H))$ $h = \arcsin(\sin \epsilon \sin \delta + \cos \epsilon \cos \delta \times \cos H)$ wherein A designates said photographing azimuth angle,
h designates said photographing elevation angle,
$\epsilon$ designates said latitude,
H designates said hour angle of each of the celestial objects, and
$\delta$ designates said declination of each of the celestial objects.

9. The method according to claim 8, further comprising:
calculating a difference $\Delta A$ between said photographing azimuth angle 'A' determined from said star map data and input said photographing azimuth angle As and a difference Oh between said photographing elevation angle h determined from said star map data and input said photographing elevation angle hs from the following equations:

$\Delta A = A - As$ $\Delta h = h - hs$, wherein a center of said imaging plane is defined as an arithmetic image center point O; and
calculating coordinates (X,Y) using said focal length information f from the following equations (I) and (II):

$X = f \times \tan(\arccos(\sin^2(hs+\Delta h/2) + \cos^2(hs+\Delta h/2) \times \cos(\Delta A)))$ (I)

$Y = f \times \tan \Delta h$ (II).

10. The method according to claim 9, further comprising:
converting a position of each celestial object obtained in said preliminary image to an amount of coordinate movement ($\Delta X$, $\Delta Y$) on said imaging plane according to the following equations:

$\Delta X = f \times \tan(\arccos(\sin^2(hs+\Delta h/2) + \cos^2(hs+\Delta h/2) \times \cos(\Delta \alpha)))$ $\Delta Y = f \times \tan \Delta h$.

11. The method according to claim 10, further comprising:
calculating amounts of positional deviations $\Delta X$ and $\Delta Y$ of said each celestial object from a corresponding celestial object in said star map data in horizontal and vertical directions, respectively, and
calculating, based on said amounts of positional deviations $\Delta X$ and $\Delta Y$ thus calculated, an amount of deviation $\Delta h$ of said photographing elevation angle that is obtained upon said preliminary photographing operation being performed from said arithmetic image center point and an amount of deviation $\Delta A$ of said photographing azimuth angle that is obtained upon said preliminary photographing operation being performed from said arithmetic image center point according to the following equations:

$\Delta h = \arctan(\Delta Y/f)$ $\Delta A = \arccos((\cos(\arctan(\Delta X/f)) - \cos^2(hs+\arctan(\Delta Y/f)/2))/\cos^2(hs+\arctan(\Delta Y/f)/2))$.

12. The method according to claim 2, further comprising calculating an azimuth-angle-direction driving speed dA/dt, an elevation-angle-direction driving speed dh/dt and an rotational driving speed d$\theta$/dt when moving said predetermined imaging area in said horizontal and vertical directions and rotating said predetermined imaging area in a rotational direction from the following equations (i), (j) and (k) so that said image of the celestial object that is formed on said imaging surface via said photographing optical system becomes stationary relative to said predetermined imaging area of said imaging surface during said celestial-object auto-tracking photographing operation:

$dA/dt = \sin \epsilon - \cos \epsilon \tan h \times \cos A$ (i)

$dh/dt = \sin A \times \cos E$ (j)

$d\theta/dt = -\cos A \times \cos \epsilon/\cos h$. (k)

13. A photographic apparatus which automatically tracks and photographs a celestial object that moves relative to a photographic apparatus due to diurnal motion so that an image of the celestial object, which is formed on an imaging surface of an image sensor via a photographing optical system of said photographic apparatus, becomes stationary relative to a predetermined imaging area of said imaging surface of said image sensor during a celestial-object auto-tracking photographing operation, said photographic apparatus comprising:
an inputter which obtains a preliminary image by directing said photographic apparatus toward an arbitrarily-selected celestial object and performing a preliminary photographing operation using said photographic apparatus, and inputs photo date information, latitude information, photographing azimuth angle information and photographing elevation angle information of said photographic apparatus obtained during said preliminary photographing operation;
an image-sensor mover which linearly moves said image sensor in directions orthogonal to an optical axis of said photographing optical system and rotates said image sensor about said optical axis; and a controller which controls operations of said photographic apparatus, wherein said controller inputs star map data of a range corresponding to the input said photo date information, said latitude information, said photographing azimuth angle information and said photographing elevation angle information; calculates a deviation amount between said location of the celestial object that is obtained from said preliminary image and said location of the celestial object which is defined in the input said star map data; corrects at least one of said photographing azimuth angle information and said photographing elevation angle information using said deviation amount; and performs said celestial-object auto-tracking photographing operation based on corrected said at least one of said photographing azimuth angle information and said photographing elevation angle information.

* * * * *